Nov. 9, 1943.  C. A. NERACHER ET AL  2,333,668
POWER TRANSMISSION
Filed Oct. 16, 1939   11 Sheets-Sheet 1
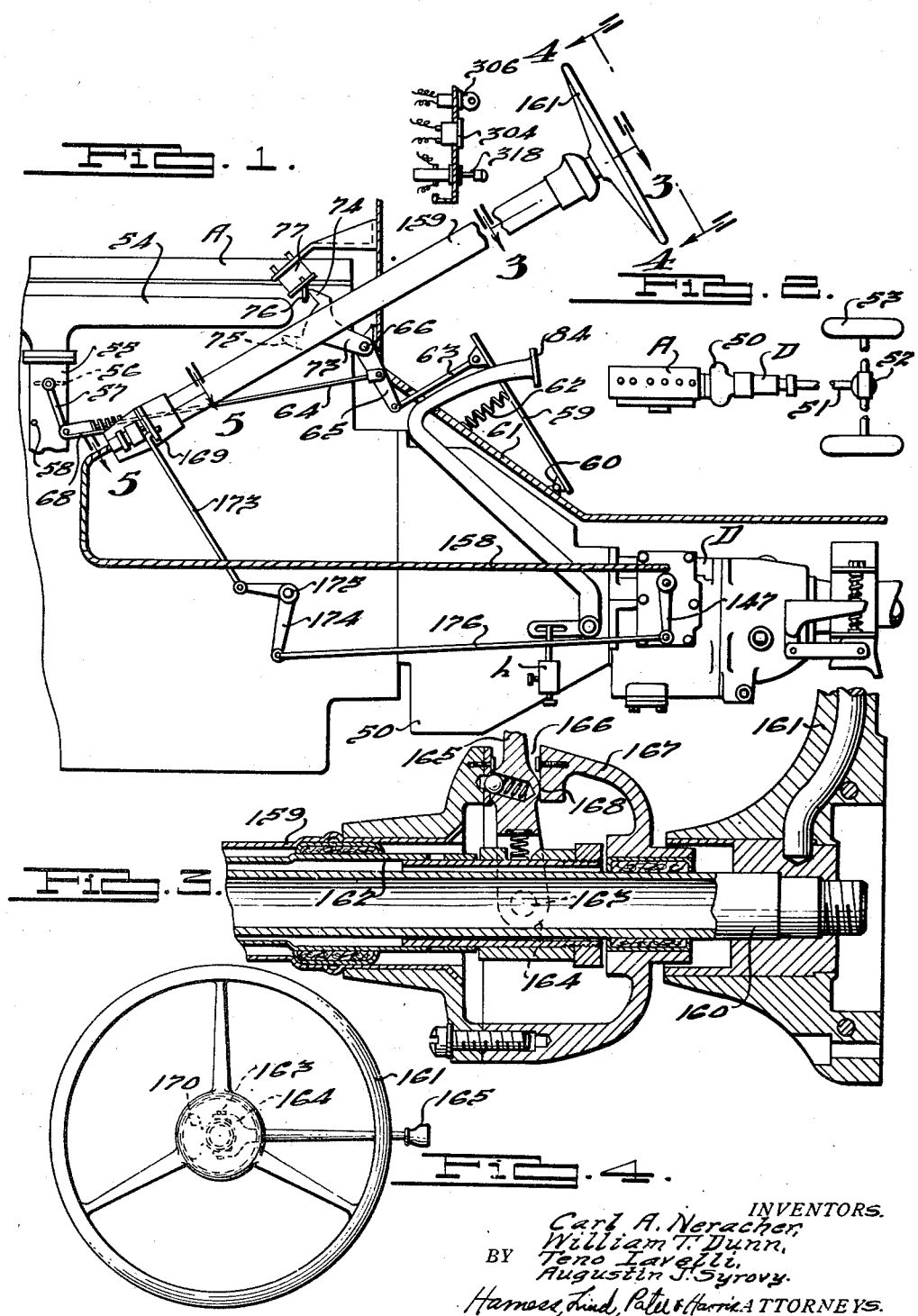
INVENTORS.
Carl A. Neracher,
William T. Dunn,
BY Teno Iavelli,
Augustin J. Syrovy.
Harness, Dind, Patu & Harris ATTORNEYS.

Nov. 9, 1943. C. A. NERACHER ET AL 2,333,668
POWER TRANSMISSION
Filed Oct. 16, 1939 11 Sheets-Sheet 2
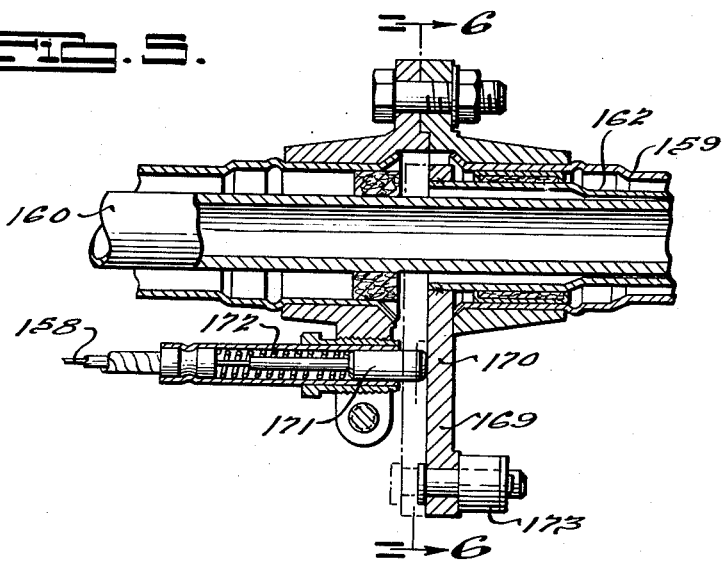
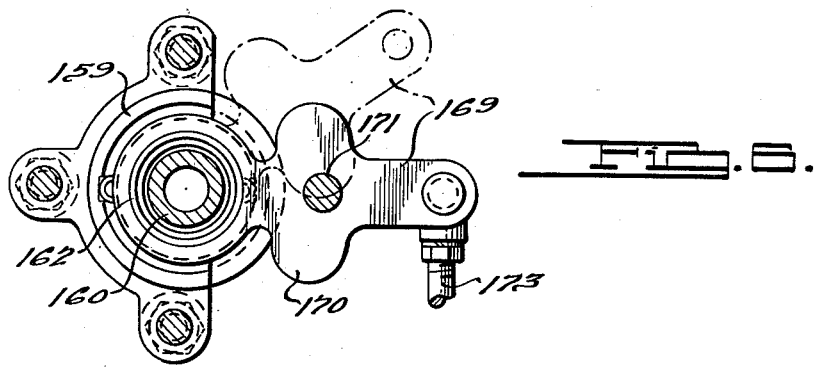
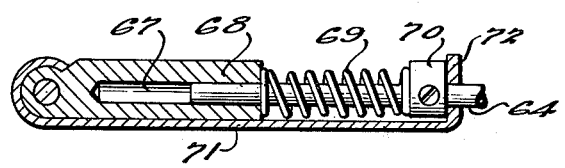
INVENTORS.
Carl A. Neracher,
William T. Dunn,
BY Teno Iavelli,
Augustin J. Syrovy.
Harness, Dicke, Pater, Harris ATTORNEYS.

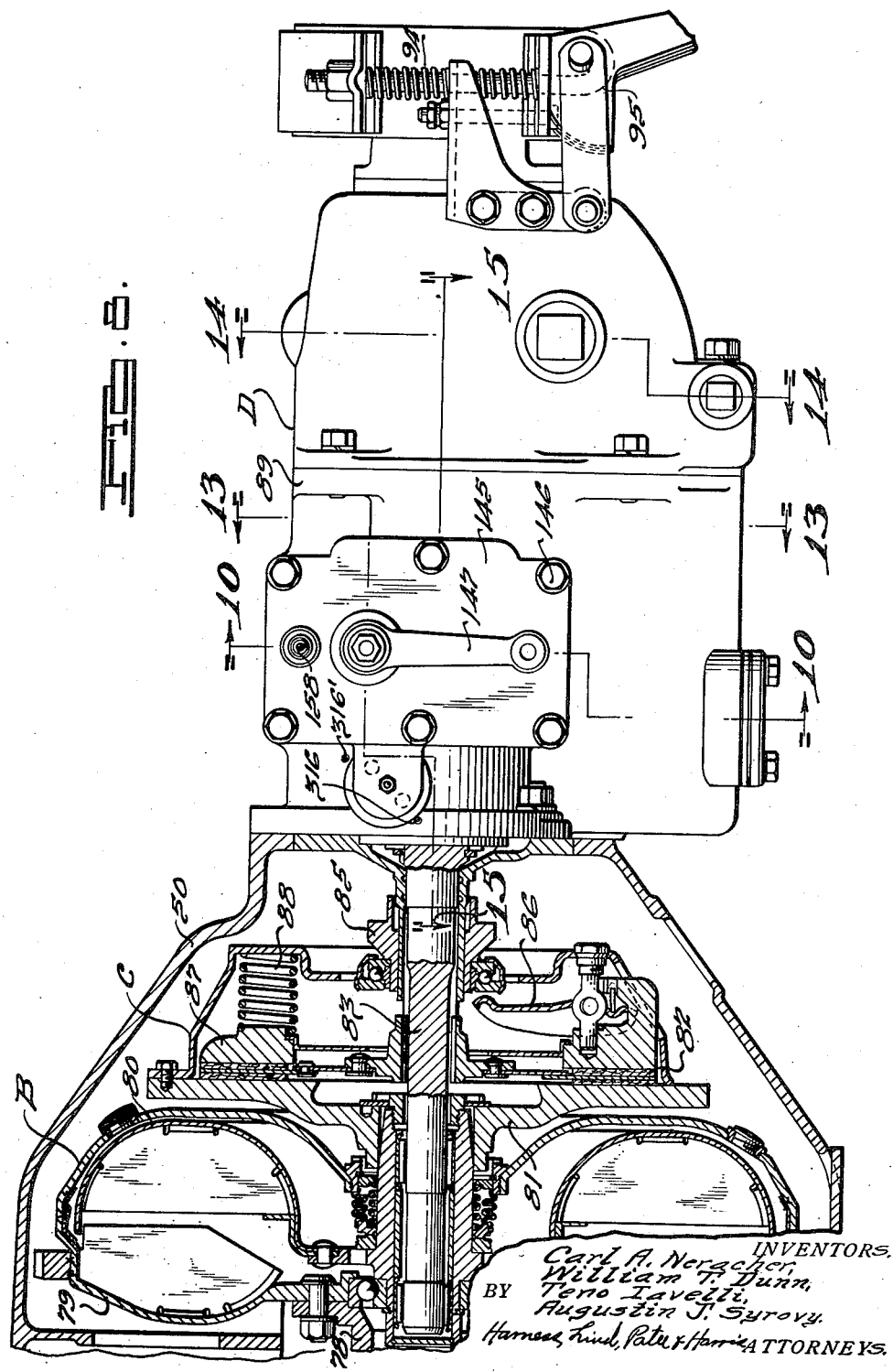

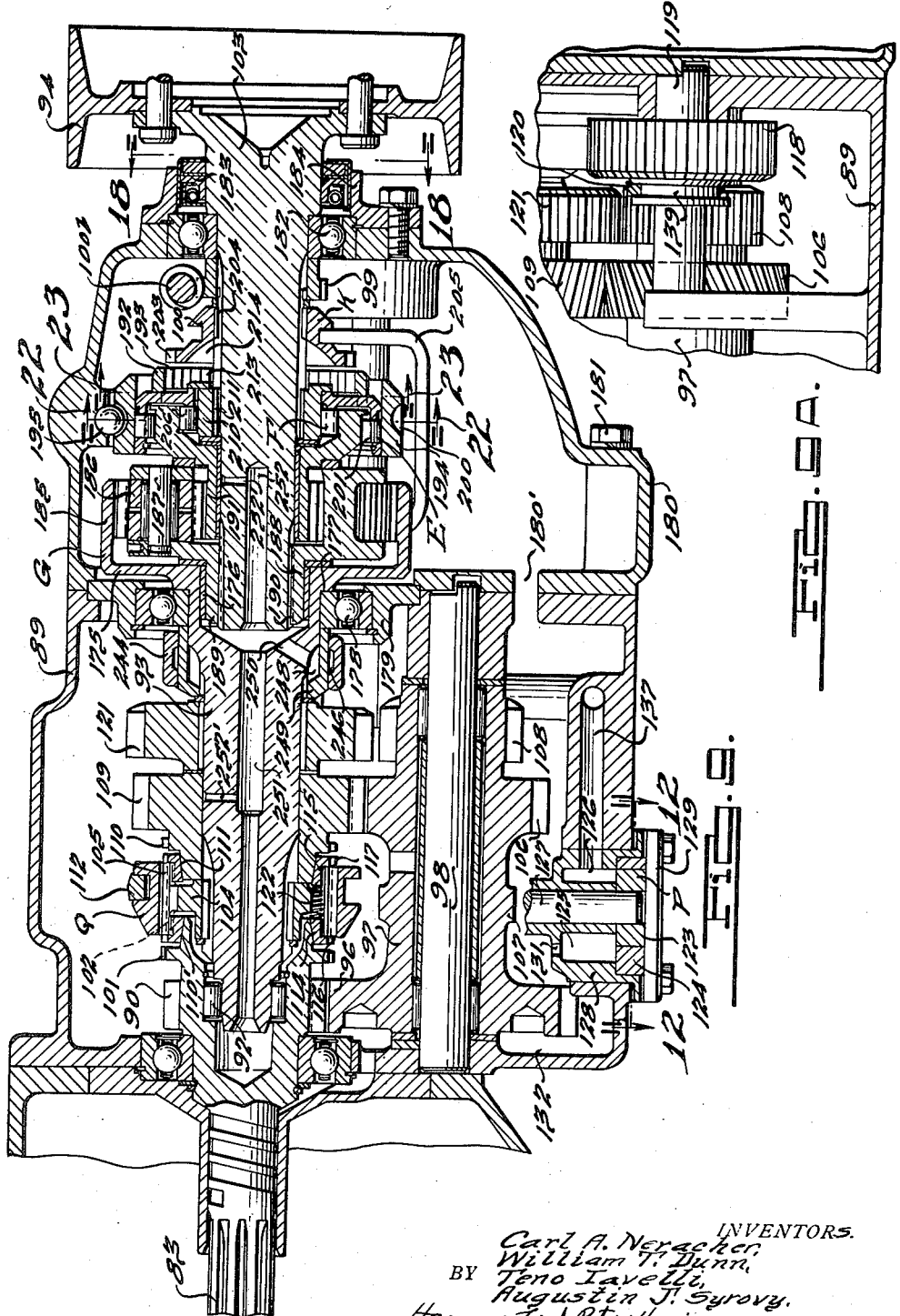

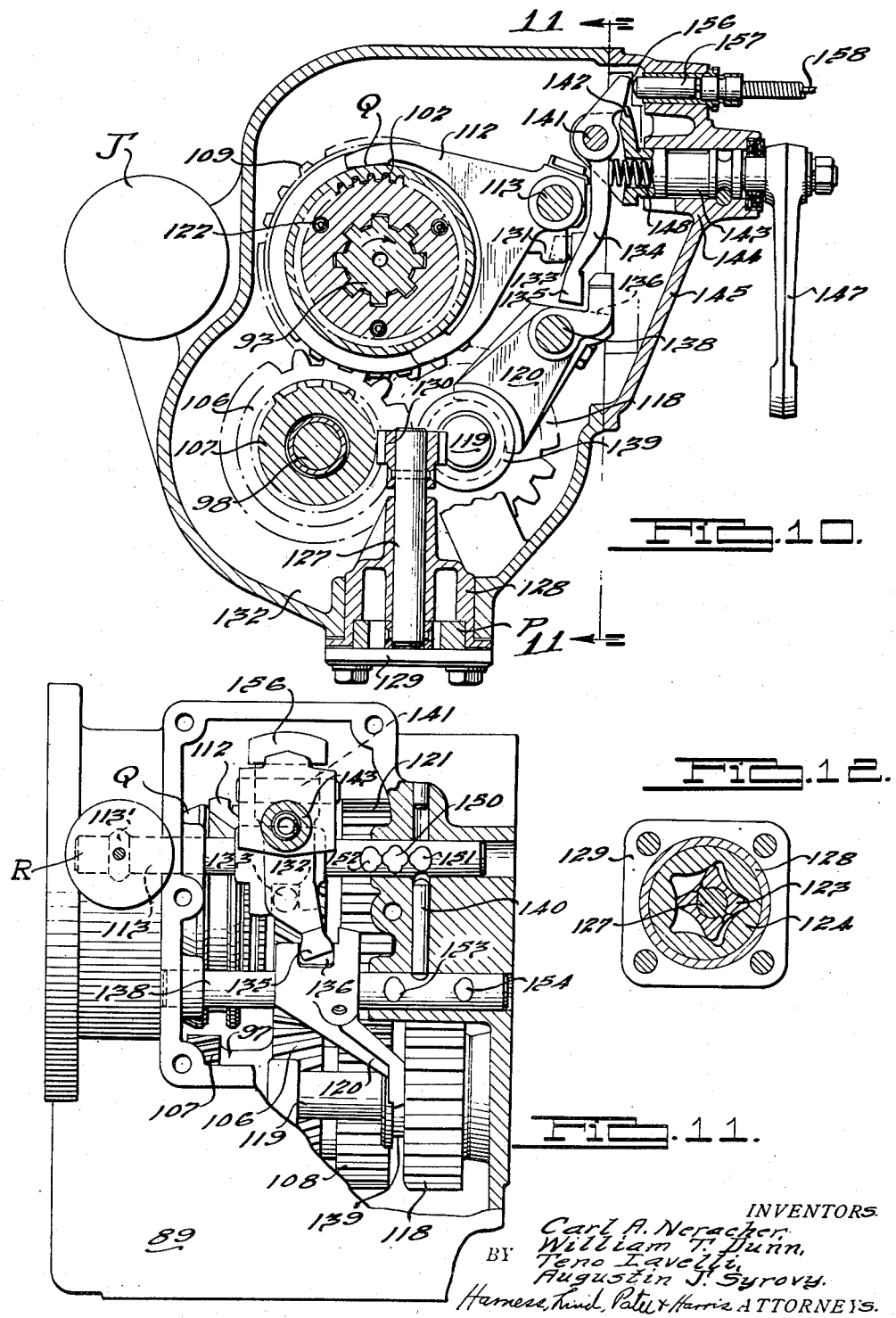

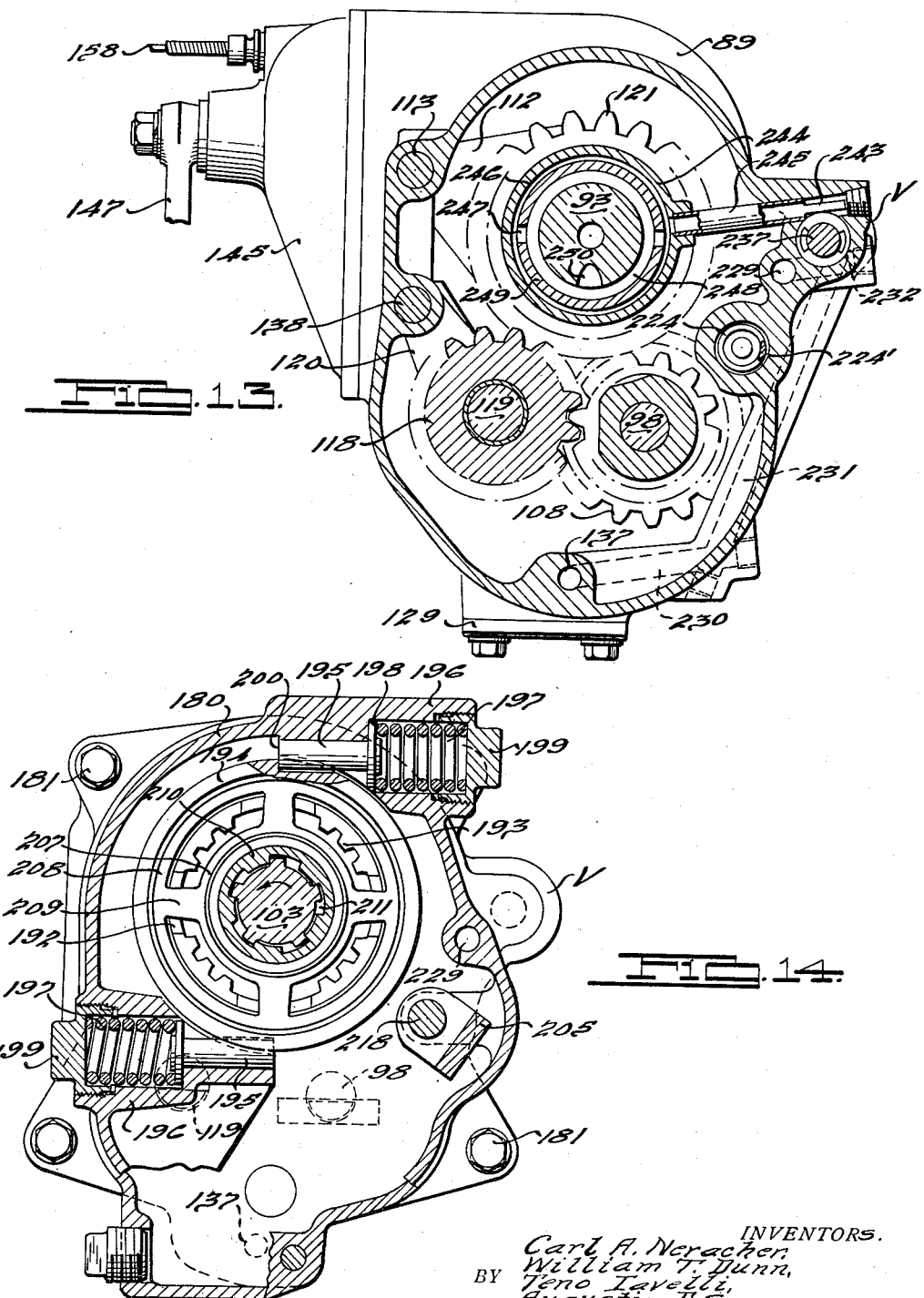

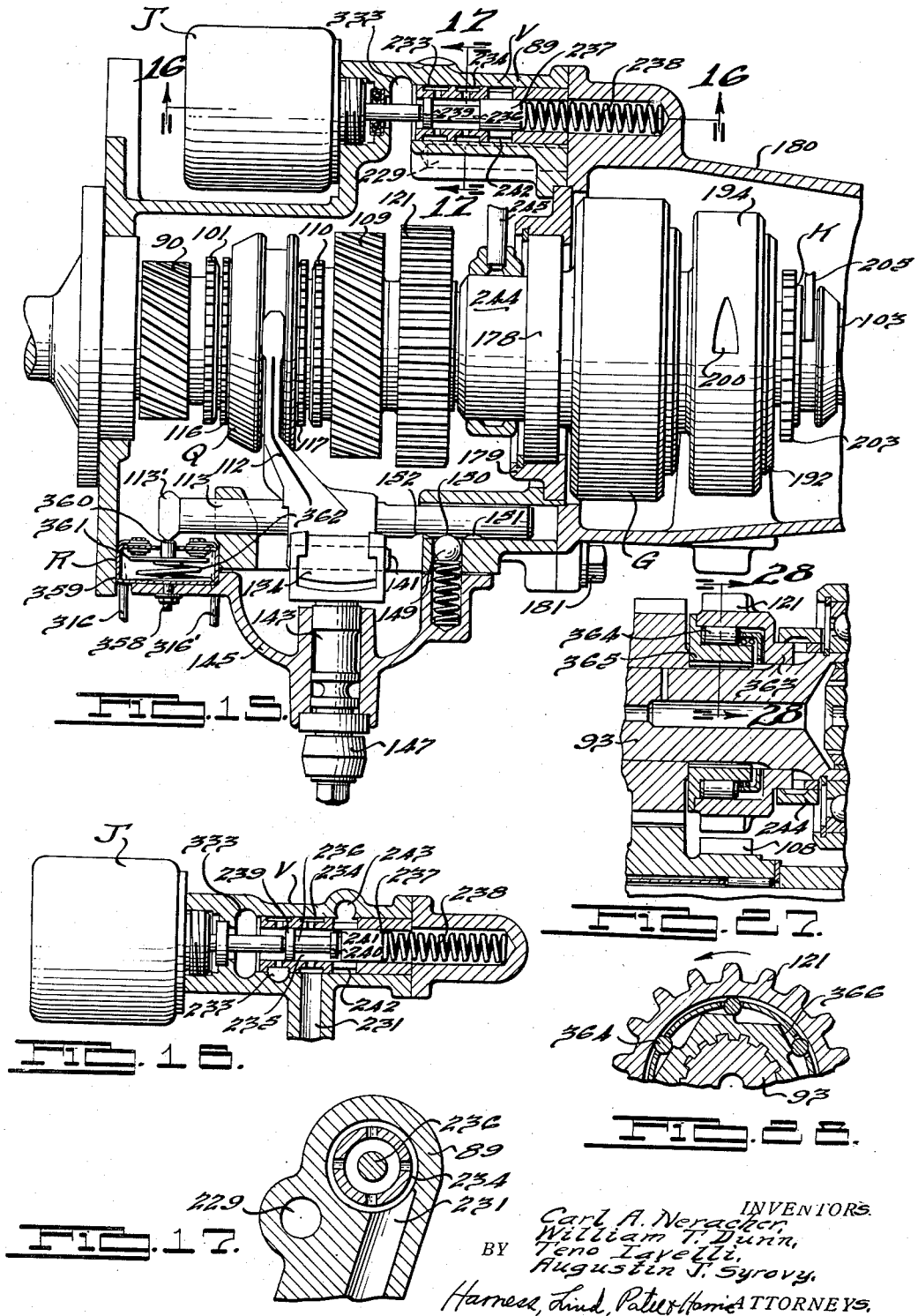

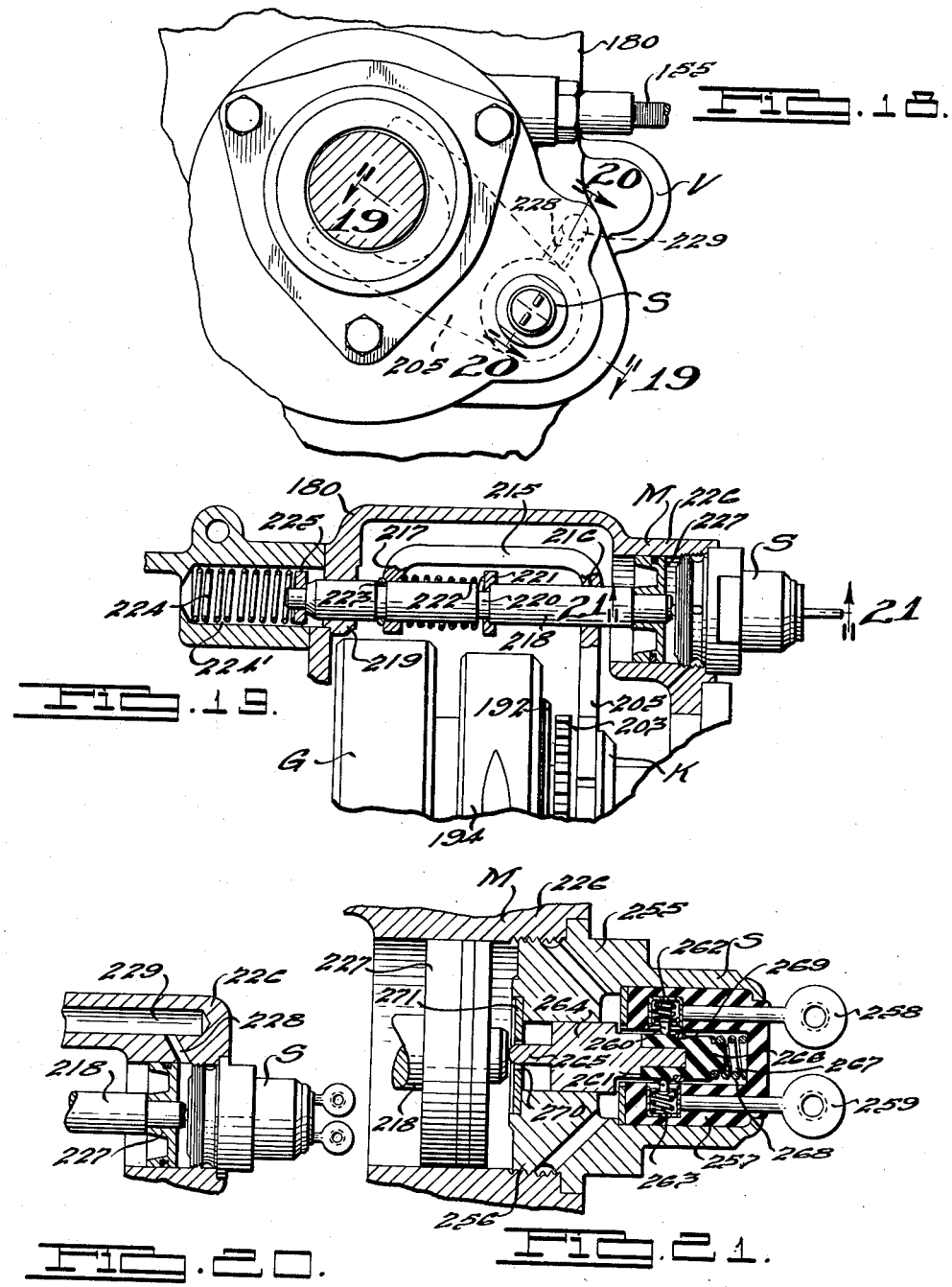

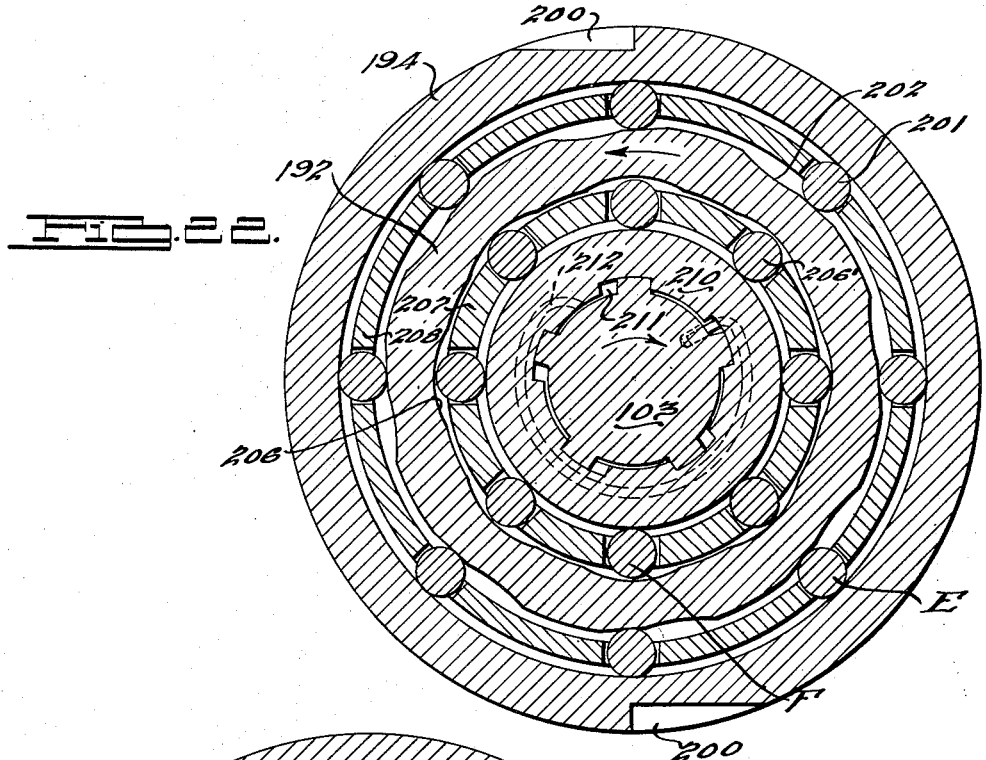
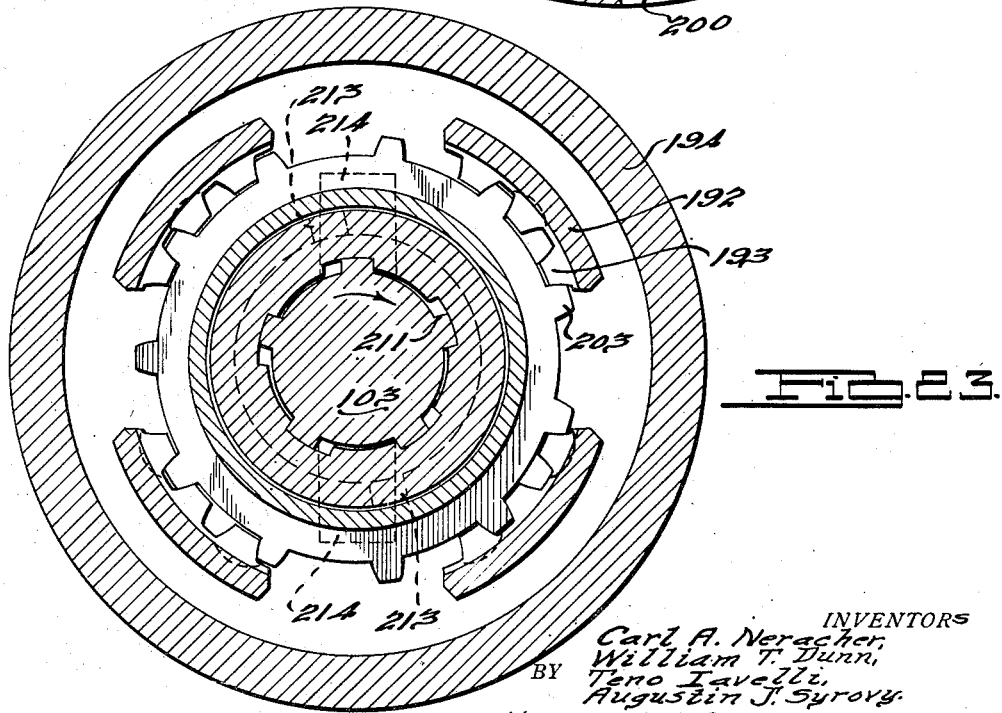

INVENTORS
Carl A. Neracher,
William T. Dunn,
BY Teno Lavelli,
Augustin J. Syrovy.
Harness, Dind, Patil & Harris ATTORNEYS Nov. 9, 1943.   C. A. NERACHER ET AL   2,333,668
POWER TRANSMISSION
Filed Oct. 16, 1939   11 Sheets-Sheet 11

INVENTORS,
Carl A. Neracher,
William T. Dunn,
BY Teno Iavelli,
Augustin J. Syrovy.
Harness, Dickey, Pierce & Harris ATTORNEYS Patented Nov. 9, 1943

2,333,668

UNITED STATES PATENT OFFICE 2,333,668

POWER TRANSMISSION

Carl A. Neracher, William T. Dunn, Teno Iavelli, and Augustin J. Syrovy, Detroit, Mich., assignors to Chrysler Corporation, Highland Park, Mich., a corporation of Delaware Application October 16, 1939, Serial No. 299,674

48 Claims. (Cl. 74—472)

This invention relates to power transmissions and refers more particularly to improved driving systems for motor vehicles.

It is an object of our invention to provide a transmission system affording improved characteristics of change speed control with a comparatively simple mechanism capable of long life.

Another object of our invention is to provide a transmission affording improved means for changing speed ratios through the medium of positively engaging clutch means having synchronous control for insuring clutching without shock or ratcheting noise.

A further object is to provide an improved system of vehicle drive incorporating both manual and automatic change speed control affording improved vehicle driving functions.

A still further object is to provide an improved pressure lubrication system that is contained entirely within the transmission casing.

We have provided an improved drive system incorporating a fluid coupling and kickdown transmission so constructed as to provide great flexibility of car control with very little effort such that nearly all driving may be done without manipulation of clutch pedals or gear shift levers and at the same time affording flexibility of car control best suited to the changing requirements of torque multiplication and other power transmitting characteristics. Our driving mechanism affords improved quietness and smoothness of car operation and facilitates manipulation of the car especially under heavy traffic conditions.

We preferably employ a relatively fast axle such that, when the transmission is in direct, the overall drive is the practical equivalent of an overdrive without driving through gear trains at such time. This is practicably obtainable without sacrificing car performance by our improved synchronous clutching means which automatically responds to manipulation of the accelerator pedal for stepping the speed ratio up or down.

With our transmission it is practicable for the driver to stay in a selected speed ratio setting while stopping, and thereafter obtain rapid car starting accelerations under favorable torque multiplication, and faster ratio boulevard or country drive conditions without operating the clutch pedal or the gear shift lever.

We have provided a manual selection of high and low ranges in our transmission, but in most instances the low range is in the nature of an emergency low and when the fluid coupling is employed very desirable car accelerating characteristics are obtained by manual selection of the high range.

According to the present embodiment of our invention, we have provided a transmission employing a countershaft and a planetary gearing and providing four forward speeds and reverse. Manual selection of the countershaft gearing may be made to high and low ranges, in each of which an automatic shift in the planetary gearing occurs to a faster drive ratio and back to the selected range, the automatic shifting being effected by natural functional manipulation of the accelerator pedal.

In one embodiment of our invention we have provided a speed responsive control on the automatic shift means controlling this shift in a novel manner.

Additional features of our invention are found in the provision of a simplified remote shift mechanism for the manual control; an improved control for preventing undesired lock-up in the parts which might cause a no-back condition; and many features of construction and functional operation which will be more apparent from the following illustrative embodiments of the principles of our invention, reference being had to the accompanying drawings, in which:

Fig. 1 is a side elevational view of the power plant and transmission for a motor vehicle.

Fig. 2 is a plan view somewhat diagrammatically illustrating the power transmission assembly in relation to the vehicle driving ground wheels.

Fig. 3 is a sectional view of the remote control hand shift mechanism taken as indicated by line 3—3 of Fig. 1.

Fig. 4 is a top plan view of the Fig. 3 mechanism taken as indicated by line 4—4 of Fig. 1.

Fig. 5 is a sectional view along line 5—5 of Fig. 1 showing a portion of the remote control shift.

Fig. 6 is a detail sectional view taken as indicated by line 6—6 of Fig. 5.

Fig. 7 is a detail sectional elevational view of a portion of the engine throttle operating mechanism shown in Fig. 1.

Fig. 8 is an enlarged side view partly in section and partly in elevation showing the Fig. 1 power transmission.

Fig. 9 is a sectional elevational view through the speed ratio changing transmission which is illustrated in elevation in Fig. 8.

Fig. 9A is a detail elevational view of the reverse idler and associated gears of the Fig. 9 transmission.

Fig. 10 is a transverse sectional view looking rearwardly as indicated by line 10—10 of Fig. 8, showing the transmission portion of the remote shift mechanism.

Fig. 11 is a detail sectional view taken as indicated by line 11—11 of Fig. 10.

Fig. 12 is a sectional plan view taken as indicated by line 12—12 of Fig. 9.

Fig. 13 is a detail sectional view taken as indicated by line 13—13 of Fig. 8.

Fig. 14 is a detail sectional view taken as indicated by line 14—14 of Fig. 8.

Fig. 15 is a detail sectional plan view taken as indicated by line 15—15 of Fig. 8.

Fig. 16 is a detail taken as indicated by the line 16—16 of Fig. 15 and showing the control valve in kickdown position.

Fig. 17 is a detail sectional view taken as indicated by the line 17—17 of Fig. 15.

Fig. 18 is a detail sectional view taken as indicated by the line 18—18 of Fig. 9.

Fig. 19 is a detail sectional view of the kickdown shift mechanism taken as indicated by the line 19—19 of Fig. 18.

Fig. 20 is a detailed sectional view taken as indicated by the line 20—20 of Fig. 18.

Fig. 21 is an enlarged sectional view of the fluid pressure control switch taken as indicated by the line 21—21 of Fig. 19.

Fig. 22 is a detail sectional view looking rearwardly of the transmission taken as indicated by the line 22—22 of Fig. 9.

Fig. 23 is a detail sectional view of the synchronous blocker clutch mechanism taken as indicated by the line 23—23 of Fig. 9.

Fig. 24 is a diagrammatic view of the transmission control system.

Fig. 24A is a sectional view on an enlarged scale of the pedal operated switch L of Figs. 1 and 24.

Fig. 27 is a fragmentary sectional view of a modified form of the invention.

Fig. 28 is a sectional view along line 28—28 of Fig. 27.

Figure 25:
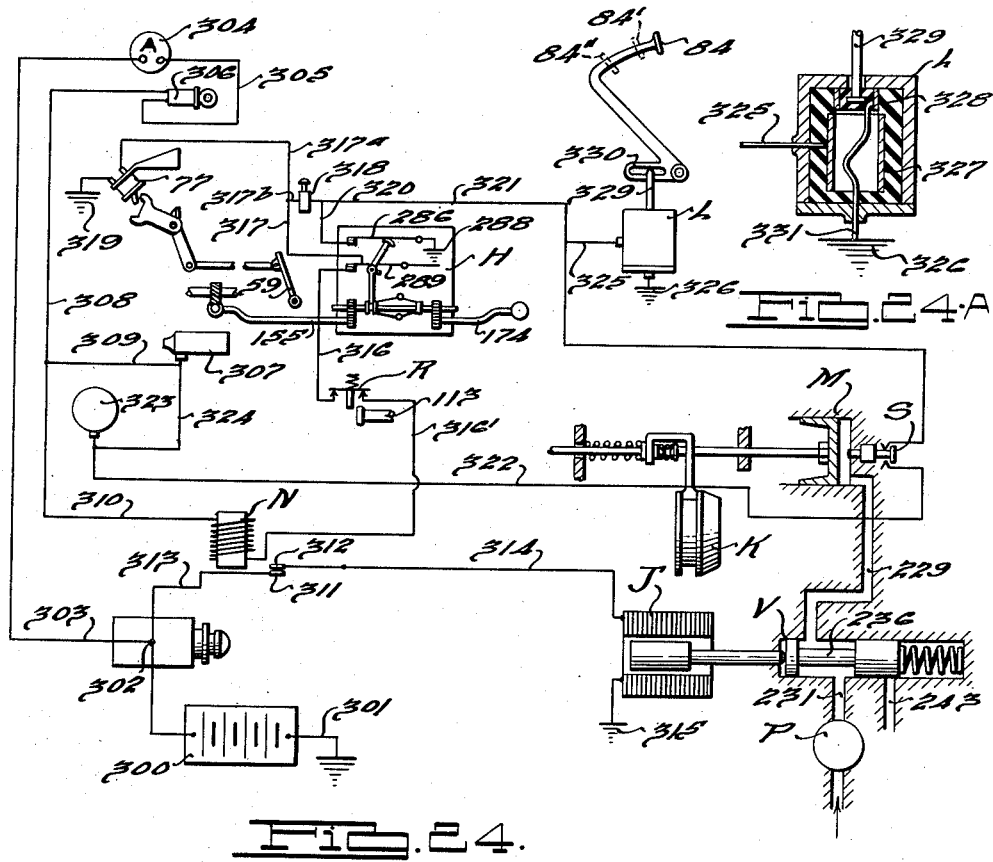
Fig. 25 is an enlarged diagrammatic view of the governor switch mechanism of Fig. 24.

We have illustrated the principles of our invention in connection with a motor vehicle drive wherein the usual engine A transmits its drive through clutching means B, C, within casing 50, the drive then passing through the change speed transmission D and propeller shaft 51 (Fig. 2) to the differential 52 and thence to the vehicle ground wheels 53 where it is desired to drive the rear wheels according to present day practice.

By preference, the arrangement is such that a "faster" rear axle ratio is afforded than is generally customary so that when the transmission is in direct drive, the car is driven in the equivalent of an overdrive ratio between the engine A and wheels 53. Our arrangement provides such conveniently operable kickdown or shift to a reduction drive from direct that the aforesaid arrangement is practicable thereby obtaining advantages of economy, long life and quietness of operation without the disadvantages of sluggish operation which is especially objectionable in city driving.

The engine A has the customary intake manifold 54 and the carburetor riser 55 containing a throttle valve 56 operable by a lever 57 throughout a range between the illustrated closed throttle position for engine idling and a wide open position limited by lever 57 engaging a stop 58. Lever 57 is adjusted by a driver operable accelerator pedal 59 pivotally mounted at 60 on the toe-board 61 to swing downwardly against restoring spring 62 to thrust through the system of pivotally jointed links 63, 64 and connecting lever 65, the latter being pivotally supported at 66.

The link 64 operates lever 57 through a lost motion device (Fig. 7) serving to normally connect these parts as a solid member but affording thrust of link 64 forwardly after lever 57 has engaged its limiting stop 58 to effect the kickdown control on the transmission. Thus, link 64 has its forward end slidable in guide 67 of finger 68 which is pivoted to the lower end of lever 57. A spring 69 acts between finger 68 and a collar 70 fast on link 64 and yields only when link 64 is thrust forwardly after lever 57 has engaged stop 58, the spring otherwise transmitting thrust of link 64 to finger 68 without lost motion. A bracket 71 limits separation between the link 64 and finger 68 and closes the throttle valve 56 when the accelerator pedal is released for upward swing by spring 62.

The throttle operating mechanism therefore is such that movement of pedal 59 throughout its normal range will cause a corresponding adjustment in the valve 56 between its limits of fully closed and wide open positions. When the pedal has been depressed to the wide open throttle position, lever 57 engages stop 58 and further depression of the pedal in its kickdown range of movement for the kickdown transmission control is accommodated by yielding of spring 69 while the throttle valve remains fully open. On release of the accelerator pedal, springs 69 and 62 both act until collar 70 engages the rear flange 72 of bracket 71 and thereafter, throughout the normal range of throttle adjustment, spring 62 alone serves to restore pedal 59 and close the throttle valve.

The kickdown range of accelerator pedal movement is utilized to momentarily unload the engine of its drive, as by shorting the ignition, and to effect disengagement of the synchronous clutch sleeve for a change in the transmission from direct to underdrive accommodated by unloading the clutch sleeve of the engine drive. The throttle being open will cause the engine to rapidly speed up as soon as the ignition circuit is restored, the underdrive being automatically effective as will presently be more apparent.

The lever 65 has fastened thereto a second lever 73 directed forwardly to provide spaced fingers 74, 75 in the path of the actuator 76 of the snap-switch 77 which is a control part of the kickdown mechanism. When pedal 59 moves in its kickdown range, finger 75 throws actuator 76 rearwardly to close switch 77, the switch remaining closed until the pedal 59 is fully released, or substantially so, at which time finger 74 restores actuator 76 to the Fig. 1 position to open the switch 77. The ignition circuit, after interruption during kickdown, is not dependent for restoration on release of the pedal 59 but is restored by other means presently described.

We preferably transmit the drive from the engine A to transmission D through clutch means comprising a fluid coupling B of the kinetic type preferably in conjunction with a releasable clutch C of a conventional design employed to facilitate manual shifts in transmission D, and to accommodate stopping the car in gear without tendency of the coupling B to cause the car to creep especially where the idle is set "fast" (as during winter starting), or where the throttle is accidentally opened.

The engine crankshaft 78 drives the coupling impeller 79 to circulate the fluid in its vaned passages to drive the vaned runner 80 in a manner well known for fluid couplings of the type illustrated. The runner 80 drives the clutch member 81 of the friction clutch C of commercial design. Driven clutch disc 82 is fixed to intermediate drive shaft 83 and is drivingly disengaged by depressing a clutch pedal 84 (Fig. 1) which slides the throw-out member 85 forwardly to operate levers 86 to unload driving pressure plate 87, springs 88 loading this plate and engaging the clutch when pedal 84 is released.

Shaft 83 extends rearwardly into the housing 89 of transmission D (Fig. 9) where it is formed with a main drive pinion 90 and a set of external driving teeth 101 which are adapted to slidably engage internal clutch teeth 102 of the synchronous coupling clutch sleeve Q. Fixed to the shaft 93 is a hub 104 formed with external teeth 105 slidably engaged with the internal teeth 102 of the shiftable clutch sleeve Q which is adapted to be shifted forwardly or rearwardly by a fork 112 fixed to a longitudinally extending shift rail 113 (Fig. 10) disposed on the left side of shaft 93 (looking forwardly of the vehicle).

The drive pinion 90 is hollow and journals, by a bearing 92, the forward end of the intermediate transmission driven shaft 93 which is adapted to drive the secondary or tail-shaft 103. The latter may carry a propeller shaft brake drum 94 having the braking mechanism generally designated at 95 operably associated therewith. The drive pinion 90 is continuously meshed with a gear 96 for driving the countershaft cluster 97 rotatable on a countershaft support 98.

The cluster 97 also includes a gear 107 which drives a pump P (Figs. 9, 10 and 12). The pump P develops the fluid pressure necessary to the operation of the automatic phase of the transmission and for lubrication thereof and is of the well known Gerotor type having an inner driving member 123 and an outer driven member 124 defining intake and delivery chambers 125 and 126, respectively. The driving member 123 is secured to a shaft 127 rotatable in a stationary pump housing 128 closed by a cover 129 at its outer end. The upper end of shaft 127 carries a gear 130 which meshes with the pump drive gear 107 of the countershaft cluster 97.

The intake of suction chamber 125 receives a constant supply of oil through an inlet passage 131 which opens into the oil reservoir or pump 132 along the bottom of the transmission casing 89. The oil under pressure is delivered from the pump pressure chamber 126 rearwardly through the delivery passage 137 which is in communication with the main control valve V (Figs. 13, 15 and 16). The valve V controls the fluid pressure motor M (Fig. 19) as well as the lubrication oil pressure of the transmission as will be explained later on in this specification.

The cluster 97 is further formed with gears 106 and 108. Gear 106 is in constant mesh with a gear 109 which is freely journalled on driven shaft 93. The reverse gear 108 is adapted to mesh with an idler gear 118 (Fig. 9A) when the latter is slid forwardly on its countershaft 119 by the fork 120 (Figs. 9A and 10). At such time idler 118 is also meshed with a gear 121 fixed on shaft 93.

A pair of synchronizing blocker rings 114, 115 are respectively disposed between the hub 104 and gears 90 and 109 and are driven with hub 104 with slight rotational clearance. These blockers have cammed teeth 116, 117 having a pitch circle the same as that of sleeve teeth 102 and teeth 101 and 110, and they are adapted to frictionally engage the cone-shaped clutching surfaces 110' and 111 respectively. If desired, energizing springs 122 may be provided between the blockers to lightly urge them into engagement with cones 110' and 111 respectively so that the blocker teeth 116, 117, are misaligned with the sleeve teeth 102 thereby preventing shift of sleeve Q as long as the parts to be clutched are rotating at different speeds. The synchronizing blocker rings are more fully described and claimed in the copending application of O. E. Fishburn, Serial No. 180,840, filed December 20, 1937.

When sleeve Q is moved forwardly, teeth 102 engage the cammed ends of blocker teeth 116 thereby urging the blocker under pressure into engagement with the cone-shaped clutch surface 110' to synchronize gear 90 with shaft 93 (clutch C being released during manual shift of sleeve Q to facilitate this clutching action). The blocker 114 will then rotate slightly relative to hub 104 to permit the sleeve teeth 102 to pass through blocker teeth 116 to engage teeth 101 thereby positively clutching shaft 93 with gear 90. The rearward shift of sleeve Q to clutch with teeth 110 of gear 109 is synchronously effected under control of the blocker 115 in the same manner.

The fork 112 is provided with a boss 131 below rail 113 (Figs. 10 and 11), this boss having a slot 132 adapted to be engaged by an inwardly extending pin 133 carried by a lever 134. This lever has a lower end 135 adapted to engage a slot 136 in a fork or yoke member 120 fixed to the reverse shift rail 138 parallel to and below rail 113. The fork 120 engages the hub portion 139 of the shiftable reverse idler gear 118. Rails 113 and 138 are interlocked by a plunger 140 to prevent the simultaneous displacement.

Lever 134 is supported between its ends by a pin 141 parallel to and above rail 113, this pin being carried by the yoked inner end 142 of shaft 143 rotatably mounted in the boss 144 of cover 145 which is secured by fasteners 146 to casing 89. The shaft 143 has its axis extending across the axis of movement of the rails 113 and 138 and has a lever 147 fixed to its other end outside of the cover 145. A spring 148 reacts on shaft 143 and yieldingly urges lever 134 clockwise (Fig. 10) about pin 141 tending to maintain pin 133 engaged in slot 132 and end 135 free from slot 136. A spring-pressed ball detent 149 (Fig. 15) yieldingly maintains rail 113 in neutral, forwardly (to clutch sleeve Q with teeth 101), or rearwardly (to clutch sleeve Q with teeth 110) by engagement of this ball detent by the rail recesses 150, 151 and 152, respectively. The reverse rail 138 has neutral and reverse positioning recesses 153, 154 respectively engaged selectively by a spring-pressed ball (not shown).

A switch R (Figs. 11 and 15) is fastened to the cover 145 and is positioned inside the transmission casing in such manner that the plunger 360 thereof will be engaged by the enlarged portion 113' on the forward end of the shifter rail 113 when said rail is in neutral position. The purpose of switch R will be explained further on in this specification.

The upper end of lever 134 has a wide face 156 engageable with the inner end of a plunger 157 slidable inwardly through cover 145 by a Bowden wire operating mechanism 158. When the wire 158 is pushed, the plunger 157 engages lever face 156 to swing the lever 134 so that the end 135 engages slot 136 while pin 133 disengages slot 132. In such position the shaft 143 may be rotated to shift rail 138 to mesh reverse idler 118 with gears 108 and 121 for reverse drive. The plunger 157 maintains a sliding engagement with lever face 156 during this rotation of shaft 143. The remote control mechanism for effecting control of lever 147 and Bowden wire 158 will not be described (Figs. 1 and 3 to 6). The fixed steering post 159 houses the usual steering shaft 160 operated by hand steering wheel 161. Rotatably journalled within the post 159 is a hollow shaft assembly 162 connected by pivot pins 163 with the yoked inner end 164 of the manually operable selector element of shift lever 165 which extends outwardly through an arcuate opening 166 formed in the head 167 fixed to post 159. Movement of lever 165 fore and aft about the axis of shaft 162 will oscillate this shaft while movement of the lever up and down will rock the lever about a fulcrum 168 to cause reciprocation of shaft 162 along its axis.

At the lower end of shaft 162 there is a lever 169 fixed thereto, this lever having an intermediate wide face portion 170 always engaged by the upper end of the plunger 171 fixed to the forward end of the Bowden wire 158. A spring 172 operates to yieldingly urge plunger 171 into engagement with the lower surface of portion 170 and to maintain plunger 157 free of engagement with lever face 156 as shown in Fig. 10. A link 173 has its forward end pivotally engaged with the outer end of the lever 169, the rearward end of this lever being connected to a bell crank lever 174 mounted on engine A at 175. The bell crank operates a second link 176 which has articulated connection with lever 147.

In order to shift sleeve Q into engagement with the teeth 110 of the low speed drive gearing 109, the operator disengages the main vehicle clutch C by depressing the pedal 84 and then swings lever 165 forwardly or counterclockwise from neutral as viewed in Fig. 4. This pushes the lever 147 rearwardly serving to shift rail 113, fork 112 and sleeve Q rearwardly. Pedal 84 is then released for the low speed drive. Swinging of lever 165 rearwardly or clockwise of neutral as viewed in Fig. 4 will swing lever 147 forwardly thereby sliding rail 113 and sleeve Q forwardly to clutch with the teeth 101 of gear 90 to establish direct drive between shafts 83 and 93. As will be explained later on, this latter operation of the lever 165 establishes a third speed ratio of the four available forward speeds.

In order to effect the reverse drive, the lever 165 is first rocked upwardly about the fulcrum 168 to thereby push shaft 165 downwardly to cause lever portion 170 to operate through the Bowden wire 158 to swing 134 counterclockwise about the shaft 141 thereby engaging the end 135 with slot 136 of fork 120 and disengaging pin 133 from engagement with the slot 132 of the boss 131. The lever 165 is then shifted rearwardly or clockwise of the steering column to cause lever 147 to rock lever 134 forwardly to effect forward shift of rail 138 thereby meshing idler gear 118 with gears 108 and 121. The clutch C is preferably released during this manual shift of sleeve Q and reverse idler 118.

From the foregoing it will be apparent that drive from the engine crankshaft 78 may be transmitted through the fluid coupling B and clutch C to the driven shaft 93 which may be driven at the speed of the shaft 83 and in the same direction; at a reduced speed and in the same direction with respect thereto; or at a reduced speed in a reverse direction with respect thereto.

Referring now again to Fig. 9, it will be seen that the shaft 93 terminates at its rearward end in an enlarged hollow portion 175 into which the forward end of the tail shaft 103 is piloted by means of a bushing 176. The shoulder 177 is provided to receive the inner race of an antifriction bearing 178, the outer race of which is received in a complementary recess formed in the member 179 which forms the rear wall of the casing 89.

A casing 180 is fastened to the casing 89 by means of the fastening screws 181 and houses the planetary gearset G and its associated mechanism which constitutes the automatic phase of the transmission. A passage 180' permits the oil in the sump of casing 180 to circulate through the sump 132.

The rearward end of the tail shaft 103 is supported at the rear end of the casing 180 through the bearing 182 and a suitable sealing device 183 is provided between the rear cap member 184 and the shaft 103 to prevent leakage of the lubricating oil on to the brake drum 94.

The rearward end of the shaft 93 is further enlarged rearwardly of the bearing 178 and is formed with an annulus gear 185 having internal teeth which mesh with a plurality of planet gears or pinions 186, each planet gear being rotatably mounted on an axle shaft 187 supported by a carrier structure 188 which has a forwardly extending hub portion 189 which extends within the hollow intermediate portion of shaft 93 and is splined at 190 to the tail shaft 103.

The planet gears 186 also mesh with the hollow sun gear 191 which is loosely journalled on the shaft 103 and has a rearwardly extending controlling portion or sleeve 192 provided with clutch teeth 193 at its extreme rearward end.

It will thus be apparent that drive from the shaft 93 may be transmitted through the annulus gear 185 to the carrier 188 and, if the sun gear 191 is held against the tendency to rotate backwardly (counterclockwise when looking from front to rear) when the shaft 93 rotates forwardly (clockwise), then the annulus gear 185 will operate through the planet gears 186 to transmit an underdrive to the tail shaft 103 relative to the speed of rotation of the shaft 93 by virtue of the carrier 188 driving through the splines 190 on the tail shaft 103. During this condition of operation, the sun gear 191 which is loosely journalled on the shaft 103 has a tendency to rotate backwardly and must be held against such rotation to provide for reaction of the underdrive. The means for holding the sun gear against counterclockwise rotation consists of a reaction taking or brake member 194 which is yieldably secured to the transmission casing 180 by means of a pair of diametrically oppositely located parallelly disposed pins 195 (Fig. 14). At each side thereof, the casing 180 is provided with a boss 196 which has a bore surrounding the pin 195. This bore is enlarged at the outer portion thereof for the reception of a coil spring 197 which is adapted to bear against an annular washer 198 rigidly attached to the outer end of pin 195. A cap member 199 is threadedly received by the casing 180 as indicated in Fig. 14 and provides for adjustment of the pressure of the spring 197.

In Fig. 14, the forward direction of rotation of shaft 103 is indicated by the arrow. It should be noted that a counterclockwise direction is indicated which is opposite to that indicated in Figs. 22, 23 which illustrate the positively acting clutch mechanism for locking up the planetary gearset G. By referring to Figs. 8 and 9 it will be seen that Fig. 14 looks from rear to front of the transmission, while Figs. 22, 23 look from front to rear, these directions having been chosen in order to fully illustrate the apparatus.

The reaction taking member 194 is provided at each end thereof with a pair of diametrically oppositely located notches 200 which receive the inner ends of the pins 195.

The reaction of the sun gear 191 is transmitted to the reaction member 194 by means of the rollers 201 which form part of an overrunning clutch designated generally by the letter E. The rollers 201 are adapted to lock the control sleeve 192 of the sun gear 191 to the reaction member 194 upon tendency of the sun gear to rotate backwardly (or counterclockwise as viewed in Fig. 22). The locking action is accomplished automatically in the manner known in the art, the member 192 having a cammed outer surface 202, the cams being so formed that the rollers 201 are automatically locked between the cams and the inner cylindrical surface of the member 194 upon tendency of the member 192 to rotate backwardly. Upon rotation of the member 192 in a forward direction (or clockwise as seen in Fig. 22) the rollers 201 are in contact with the low portion of the cams and the member 192 is automatically released from the reaction member 194 as will be presently described.

In the event that the sun gear 191 is directly drivingly connected with one of the other elements of the planetary train, then the entire train will be locked to cause the gearing to rotate as a unit and transmit a direct drive from the shaft 93 to the tail shaft 103. We have provided means for locking the sun gear 191 to the shaft 103 for rotation therewith, and, under such conditions, the sun gear 191 will rotate in a forward direction and will overrun the reaction member 194 as will be permitted by the overrunning device E.

The means provided to lock the sun gear to the shaft 103 is automatically operable under control of the vehicle driver and comprises a longitudinally shiftable clutch member K having a set of external teeth 203 adapted to mesh with the internal teeth 193 provided on the rearward end of the sun gear control sleeve 192. The clutch member K is splined on the shaft 103 at 204 and is adapted to be shifted by a shift yoke 205 as will be hereinafter explained.

As can be seen from Figs. 22 and 23, taken in conjunction with Fig. 9, the control sleeve 192 is also provided with an internal cam 206 which forms one member of a second overrunning device F, the roller cage 207 of which is integrally connected to the cage 208 of the outer overrunning device E by a plurality of legs or spokes 209 as illustrated in Fig. 14. The second member of the overrunning device F consists of a blocker member 210 loosely splined on the shaft 103 as indicated at 211. A coil spring 212 fastened to the blocker member and to the shaft 103 as shown in Fig. 22 acts to yieldingly rotate the blocker rearwardly so as to engage the enlarged internal splines of the block against one side of the mating splines on shaft 103.

The blocker 210 has a pair of diametrically oppositely located, rearwardly projecting lugs or pins 213 which are adapted under certain conditions of operation to be received into recesses 214 provided in the forward face of the clutch member K. Under ordinary driving conditions in underdrive, the spring 212 maintains the blocker member 210 in the position shown in Fig. 23. In this position the blocker 210 is rotated rearwardly on the shaft 103 as far as the clearance around the splines 211 will permit, and the lugs 213 are so disposed on the blocker with respect to the splines, that they will engage the forward face of the clutch member K at points misaligned with the recesses 214 as illustrated in Fig. 23. Under such conditions, forward movement of the clutch member K, under the influence of the shift yoke 205, will be prevented.

Rearwardly of the member K on shaft 103 is mounted a worm wheel 99 which drivingly engages a worm 100 mounted on a shaft 100b, the latter constituting the speedometer drive for the vehicle speedometer.

The automatic control for the clutch member K will now be described. As aforesaid, the clutch member K has a shifting groove engaged by the shift yoke 205 which extends downwardly and outwardly (Figs. 18 and 19) in the casing 180 and then rearwardly in the form of a bar 215, the end of which is bent inwardly at shoulder 217 to slidably receive a shift rod 218. This shift rod extends longitudinally of the transmission and is guided for reciprocation in the casing by the bracket 219. The rod also slidably extends through the yoke 205 at 216. The rod 218 is grooved at 220 to receive an abutment snap ring 221, a compression spring 222 acting between this ring and the yoke shoulder 217. A stronger spring 224 disposed within the bore 224' acts between the end of said bore and an abutment collar 225 fixed to the forward end of the rod 218 and serves to yieldingly thrust the rod together with the yoke 205 and the clutch member K rearwardly to Fig. 19 position. The yoke 205 is limited in its forward movement relative to the rod 218 by the abutment ring 223 which is fixed in a suitable groove in the rod 218 as illustrated in Fig. 19. Forward movement of the rod 218 is limited by abutment of the ring 223 against the bracket 219, the rod being capable of forward movement in advance of forward shift of the yoke 205 and clutch member K.

Forward shift of rod 218 is effected by prime mover means preferably in the form of a pressure fluid motor M which comprises a cylinder 226 slidably receiving a piston 227 fixed on the rearward end of rod 218. The cylinder head consists of the casing of a switch S which threadedly engages the cylinder, the function of which will be made apparent later on in the specification. The switch casing S limits rearward movement of the piston and rod under the action of the spring 224. Pressure fluid, preferably oil, is admitted to cylinder 226 in rear of piston 227 through the communicating delivery passages 228 and 229.

The passage 229 extends longitudinally of the transmission housing as shown in Figs. 13, 14, 15 and 20 and communicates with the pressure port 233 of the valve V (Figs. 15 and 16). The oil pressure is developed by the pump P which delivers the pressure fluid into the passage 137 from which the oil flows through the passages 230 and 231 (Fig. 3) which extends respectively transversely and upwardly of the casing 89. The passage 231 communicates directly with the intake port 234 of the valve V as shown in Figs. 13, 15 and 16, thus assuring a constant supply of oil under pressure in the chamber 235 of the valve V at all times when the shaft 83 is rotating.

Besides serving as a control means for the motor M, valve V also regulates the lubrication pressure of the entire transmission. As will be seen from Figs. 15 and 16, the bore or chamber 235 of the valve V is adapted to receive the stem 236 and piston 237, the latter being urged forwardly by a spring 238 housed in the rearward end of said bore. The stem 236 is adapted to abut the piston 237, but is unconnected thereto, and has a pair of enlarged portions 239 and 240 formed integrally therewith, the latter having a plurality of openings 241 which permit the pressure fluid in chamber 235 to impinge upon the forward end of the piston 237 regardless of the position of the stem 236. The lubricating portion 242 of the valve V communicates with a passage 243 (Figs. 13 and 16) which in turn communicates with a lubricating slip ring 244 through the pipe 245. The lubricating slip ring 244 has an internal groove 246 formed on its inner periphery. A plurality of passages 247 (Fig. 13) establish communication between the groove 246 and an annular chamber 248 formed by a bushing 249 which surrounds the shaft 93 adjacent the bearing 178. The chamber 248 communicates through a passage 250 with the axial bore 251 of the shaft 93 which permits lubricating oil to be distributed rearwardly to the planetary gearset G, the overrunning devices E, F, etc. Suitable oil holes, such as 252' are provided to facilitate distribution of the oil to all of the parts to be lubricated.

The spring 238 forms the pressure regulating means for the lubrication system of the transmission and limits the pressure developed by the pump P. Any suitable size of spring may be used to suit various conditions, a spring of approximately 45 lbs. pressure having been found satisfactory.

As aforesaid, there is a constant supply of oil under pressure in the chamber 235 of valve V at all times when shaft 83 is rotating. Under such conditions piston 237 will be maintained by the oil pressure in a rearward position against the spring 238 by the fluid impinging thereon and port 242 of the valve will be uncovered. The fluid also impinges on the enlarged portion 239 of the stem 236 thus maintaining the stem in forward (open) position as illustrated in Fig. 15. Pressure port 233 is thus normally open and the pressure fluid entering chamber 235 through port 234 flows unrestricted through passage 229 and into cylinder 226 (Fig. 20).

Assuming that the vehicle is driven in underdrive with the sun gear 191 locked to the casing 180 by action of the overrunning device E; as soon as the pump P develops sufficient pressure to overcome the combined pressures of the springs 222 and 224, the rod 218 (Fig. 19) will be moved forwardly by the piston 227 until the ring 223 contacts the bracket 219. Loading of the spring 222 will of course tend to cause forward movement of the shift yoke 205 and clutch member K which action is prevented, during acceleration of the car in underdrive, by the blocker 210 as described previously.

Under this condition of operation switch S is maintained by fluid pressure in the position shown in Fig. 21 even though the rod 218 has moved out of contact with the plunger thereof. The switch S comprises a casing 255 formed with a neck 256 threaded for mounting in the rear end of the cylinder 226. The casing contains the insulating body 257 carrying terminals 258, 259 and movable contacts 260, 261. The latter are in electrical contact respectively with the terminals 258, 259, and are in the form of plungers urged radially inwardly of the body 257 by the coil springs 262, 263. Switch S further comprises a plunger 264 having a reduced forward portion 265 and an insulating rear end portion 266. A coil spring 267 disposed between the latter and the rear end of the bore 268 provided in insulating body 257 urges the plunger 264 forwardly. A contact ring 269 is fixed in a suitable groove in the insulating portion 266 and serves to close the switch by connecting contacts 260, 261 upon movement thereof in either direction past said contacts.

Switch S is normally maintained open (as in Fig. 21) by either of two means, viz., the pressure fluid in cylinder 226 which contacts the plunger 264 through the clearance 270 provided between the reduced portion 265 and an annular ring 271 which is fixed to the casing 255; or by the rod 218 which contacts the portion 265 of the plunger when at the end of its rearward stroke as shown in Fig. 21. The switch S is in series with the kickdown switch 77 and, as will be presently apparent, functions to momentarily ground the engine ignition system to secure the reversal of engine torque necessary to facilitate kickdown movement of the clutch member K.

Referring to Figs. 9, 18 and 25, the shaft 100b drives a flexible cable 155 of the type known in the art and commonly used for driving vehicle speedometers. Intermediate the housing 180 and the speedometer (not shown) the cable 155 passes through the housing 272 of a governor switch mechanism H. The housing 272 may be fixed to the vehicle floorboards, the dash, or any other convenient place and has journalled therein a shaft 273 on which is fixed a driven gear 274 in mesh with the drive gear 275 mounted for rotation by the cable 155. The opposite end of shaft 273 carries the gear 276 which meshes with the gear 277 for driving the speedometer-end 174 of the cable.

Fixed to shaft 273 is a collar 278 of a governor 279 of the well-known flyball type which operates the sliding collar 280 toward collar 278 as the weights fly outward under the influence of centrifugal force. Pivotally mounted to the casing at 281 is a lever having arms 282 and 283. Lever arm 282 has its free end in collar 280 while arm 283 has its upper end formed with a cam or finger 284. A second cam finger 285 is secured to the lever adjacent pivot 281.

When the governor 279 is not operating, finger 284 engages the spring switch contactor 286 which then engages a fixed switch piece 287, these elements comprising the low speed control switch X. Contactor 286 is grounded at 288 and the arrangement is such that this contactor is sprung upwardly to open the switch X at low car speeds (about 10 M. P. H. or thereabouts) so as to function as a cut-out at some predetermined critical speed which will be constant for a given car speed regardless of the transmission gear ratio then in use, because of the fact that the governor mechanism H is driven from the tail shaft 103.

The finger 285 is so proportioned that at a relatively high car speed, say 55 or 60 M. P. H., this finger will in similar manner raise switch piece 289 away from fixed switch piece 290 of the high speed control switch Y. As the car accelerates from rest, the switch X therefore first opens at a speed of approximately 10 M. P. H. car speed and stays open above this speed. When the car reaches approximately 55 M. P. H. then the switch Y opens to break the kickdown circuit and thereby render the kickdown mechanism inoperative.

The above will be clear from Fig. 24 which is a wiring diagram of the transmission.

In Fig. 24, the vehicle battery is designated by the numeral 300 and is grounded to the frame at 301. The other side of the battery is connected to the starting motor terminal 302 and a wire 303 connects this terminal to one side of the vehicle ammeter 304. The other side of the ammeter is connected with the ignition switch 306 by wire 305. The other side of the ignition switch is connected to the ignition coil 307 through wires 308 and 309, the former having a branch 310 connected to the coil of a relay N. The latter controls the solenoid J and may be energized by several different connections to a ground. Upon energization of the relay N by any one of the several means about to be described, the movable contact piece 311 is moved into electrical contact with the fixed contact piece 312 thereby connecting the coil of solenoid J with the battery 300 through wires 313 and 314. The other side of the solenoid J is grounded at 315.

A wire 316' connects the coil of relay N with one side of the switch R, the other side of the switch being connected through wire 316 to the fixed contact piece 290 of the high speed governor controlled switch Y, the movable contact 289 of which is connected by wires 317 and 317a with the kickdown switch 77, the latter being grounded at 319. A wire 317b connects wire 317 with one side of a dash controlled switch 318, the other side of this switch being connected by wire 320 with the fixed contact 287 of the low speed governor controlled switch X, the movable contact of which is grounded at 288. Switch 318 is also connected by wire 321 with one side of the switch S which, as aforesaid, functions to momentarily ground the ignition upon kickdown manipulation of switch 77. As illustrated in Fig. 24, the other side of switch S is connected through wire 322 with the distributor 323 and the coil 307 through wire 324.

The switch 318 is normally closed and is preferably used only in emergencies, so that the engine may be started by towing the car with the sleeve K engaged as will be presently apparent.

The switch R is open at all times except when the vehicle is being driven in one or the other of the forward speeds obtainable by manipulation of the shift clutch member Q as will be presently made apparent.

The wire 321 is also connected through wire 325 with a switch L, the latter being grounded at 326. The switch L is operated by the clutch pedal 84 and acts to energize the relay N during operation of the pedal 84 to release the clutch C. Any suitable type of switch may be used such as that diagrammatically illustrated in Fig. 24A which comprises an annular elongated conductor 327 slidably engaged in closing the switch by a conductor 328 carried by a rod 329 moved by the lever portion 330 of pedal 84. Conductor 328 is grounded by wire 331 while conductor 327 is connected to the aforesaid wire 325.

The arrangement is such that the switch L is closed prior to unloading of the clutch C. Thus, as the pedal 84 is depressed, the first part of the movement to the position 84' takes up the clutch operating clearance during which lost motion interval the clutch pedal moves conductor 328 into electrical contact with the conductor 327 thereby energizing the relay N. Continued movement of the pedal 84 to position 84'' effects release of the clutch C while maintaining the switch L closed, conductor 328 sliding along conductor 327.

Because of the difficulty of diagrammatically showing the valving V and the other parts of the transmission mechanism in the Fig. 24 diagram, these parts have been slightly rearranged and abbreviated in form although functionally operating as in the more detailed showing.

The operation of the power transmission as a whole is as follows.

With the car parked, the transmission D will, of course, be in neutral with the manually shiftable sleeve Q and the automatic shiftable clutch member K positioned as shown in Fig. 9. The ignition is off at switch 306 and the relay N and solenoid J are de-energized, the valving V being positioned as shown in Figs. 15 and 24.

The engine is normally started with the transmission in neutral. As soon as the selector lever 165 is shifted into one of the forward driving positions, switch R will close and the relay N will be energized thus closing the contact 311, 312 and causing the solenoid J to be energized. Energization of the solenoid J causes the valve stem 236 to be moved to the Fig. 16 position venting the motor M by establishing communication between passage 229 and the interior of the transmission casing by way of passage 333. It may also be noted that at this time both the high speed and the low speed switches X and Y of the governor controlled mechanism H are closed as shown in Figs. 24 and 25. The clutch member K remains in its rearward released Fig. 9 position. When the engine starts, the forward rotation of the crankshaft 78 drives the pinion 90 through the fluid coupling B and main clutch C thereby driving the countershaft clutch 97 in its normal backward rotation and causing rotation of the pump P. With the pump P operating, pressure fluid is delivered through passage 137 and thence through passages 230 and 231 into the chamber 235 of the valve V, thereby causing the piston 237 to be moved rearwardly against the spring 238 to uncover the port 242 thus permitting lubricant to be directed through the pipe 245 into the groove 246 of the slip collar 244 so that as the engine idles, oil under pressure is supplied to the transmission lubricating system. It may be noted that ordinarily the drag or creep effect at the coupling B will cause the runner 80 to drive even with the engine idling, although if desired, means may be employed to prevent drive of the pinion 90 during the time that the engine is idling and the car is stationary. To start in the low or slowest driving speed ratio ordinarily called first speed, the driver depresses clutch pedal 84 to release clutch C and then shifts the manually operable selector lever 165 forwardly to the low range thereby causing the manually shiftable sleeve Q to shift rearwardly for blocker synchronizing clutching with the teeth 110 of the low speed gear 109. This shift is facilitated by release of clutch C thereby disconnecting the pinion 90 from the engine A at coupling B.

Depression of the clutch pedal 84 closes the switch L, but as the solenoid J is already maintained in energized condition by the action of the switches X and Y in the governor controlled mechanism H, the switch L has no function at this time.

The driver then releases the pedal 84 to engage the clutch C while depressing the accelerator pedal 59 to start the car in first or low speed. The drive in first is obtained as follows: Pinion 90 drives gear 96 causing rotation of the cluster 97 and gear 106 which in turn drives gear 109 the latter being clutched to the intermediate shaft 93 by the shift member Q. The drive passes from the shaft 93 and annulus gear 185 to the carrier 188 of the planetary gearset C and thence to the tail shaft 103. During this time the sun gear 191 is locked to the member 194 and thus to the casing 180 by the action of the overrunning device E. It may thus be seen that a double reduction drive is obtained by the action of the gears in the casing 89 and the planetary gearset G in the casing 180.

In the event that the car is accelerated in first to a speed sufficient to cause the governor controlled switch X to open thereby de-energizing the solenoid J and causing the valve V to deliver fluid into the motor M, the clutch member K will be prevented from shifting forwardly beyond its Fig. 9 position because the blocker 210 will lag behind the member K in blocking position.

The drive in first is a "non-free wheeling" drive below approximately 10 M. P. H. car speed because within such limits the low speed governor control switch X remains closed and the solenoid J remains energized thus maintaining motor M vented. Upon coast of the vehicle the driven shaft 103 attempts to overrun the intermediate shaft 93 by automatic release of the overrunning device E; but as the annulus gear 185 then becomes the reaction element of the planetary train, the sun gear is given a forward rotational tendency and the rollers 206' of the overrunning device F lock the member 210 to the carrier 188. Thus the ratio on coast in low or first speed is a 1 to 1 ratio and no "free-wheeling" takes place.

When the car is driven above 10 M. P. H. in first, this being the normal operation of the car and being one reason for setting the critical speed of the low speed governor controlled switch in the assumed low car speed, the switch X opens, thereby de-energizing the solenoid J whereupon the stem of the valve V moves from its Fig. 16 position to the Fig. 15 position. This causes delivery of the pressure fluid into passage 229 thence into the motor M whereupon piston 227 and rod 218 move forwardly only slightly or until the clutch member K abuts the lugs 213 of the blocker member 210 whereupon the blocker member prevents further forward shift of the clutch member. It may also be noted that the fluid switch S remains open after piston 227 moves forwardly by reason of the fluid pressure in the chamber forwardly of the piston 264 (Fig. 21).

While the car is being driven in the foregoing condition above 10 M. P. H. in first, the shift from first to second is automatic and operates in response to the driver release of the accelerator pedal 59 sufficiently to slow down the engine speed to the point where the blocker member 210 will be rotated forwardly sufficiently to unblock forward movement of clutch member K. This is most conveniently accomplished by simply letting up on the accelerator pedal 59 whereupon the speed of the engine quickly drops while the car maintains its speed by reason of overrun at clutch E. Release of the accelerator pedal will cause a reversal of driving force through the planetary gearset G and the tailshaft 103 will momentarily become the driving shaft while the intermediate shaft 93 will tend to decrease in speed due to the slowing down of the motor. Under such conditions the annulus gear 185 will drop off in speed and will become momentarily the reaction element of the planetary train instead of the driving element. Planet carrier 188 which is splined to the shaft 103 at 190 will then begin to drive sun gear 191 in a forward (clockwise) direction, the control sleeve portion 192 overrunning the reaction member 194 through the rollers 201 of the clutch E. The sleeve 192 will then immediately become drivingly locked to the blocker member 210 because of the cam 206 which will then wedge the rollers 206' of overrunning clutch F (see Fig. 22) into driving engagement. Blocker member 210 will then tend to drive the shaft 103 and will rotate forwardly slightly with respect to said shaft to take up the lost motion incident to the loose splined connection 211. This slight forward rotation of the member 210 is designed to be just sufficient to unblock the lugs 213 which action will allow said lugs to enter the openings 214 of the clutch member K and will allow said member to move forwardly under the action of the spring 222 (Fig. 19) which was previously loaded by the forward movement of the piston 227 and the rod 218, thereby engaging the teeth 203 of the clutch member K with the teeth 193 of the control sleeve 192. At this stage the shaft 103, the blocker 210, the sleeve 192, and the slutch member K are all rotating forwardly with the shaft 93, thus engagement of the teeth 203 and 193 is accomplished positively and silently.

Opening of the engine throttle will now cause the engine to be driven forwardly with the planetary gearset G locked up to rotate as a unit thereby giving a 1 to 1 driving ratio through the gearset, and causing shafts 93 and 103 to rotate at identical speed.

Under certain conditions of operation it may occur that the teeth 193 will be in such position with relation to the teeth 203 that these two sets of teeth will abut and block forward movement of the clutch member K during release of the drive as described above. In such case, at the instant the driver opens the throttle to accelerate the vehicle there will be a tendency for the clutch member K to rotate forwardly with relation to the member 192 which latter member will tend to rotate rearwardly due to reaction of the drive through the planetary gearset. Very slight relative movement of these parts will of course unblock the teeth which will slide into mesh under the influence of the pressure of spring 222 thereby establishing direct drive. If desired, either of the teeth 203 and 193 or both sets may be slightly bevelled to facilitate meshing.

During the above described cycle of operation the overrunning rollers 201 and 206' which form parts of clutches E and F respectively will have a definite relation because of the interconnection between cages 207 and 208. In other words, the rollers 206' will always be in non-driving position during the period rollers 201 are locked and rollers 201 will be held in their neutral position during the period of lock-up of the rollers 206' with members 192 and 210.

This feature is of paramount importance in the efficient operation of the transmission as it prevents an uncontrollable no-back condition which might occur if the car were driven against an obstruction with sufficient force to spring the bumper thereof. Under such conditions with the transmission in gear, backward thrust would be exerted on the vehicle by the bumper which would tend to turn the tail shaft 103 backwardly and wedge both sets of the overrunning rollers into lock-up position thereby making it impossible for the driver to manipulate the sleeve Q out of mesh because of the frictional load of the teeth of the engaged gears and clutches in the transmission. With the arrangement just described, such an uncontrollable no-back condition will never occur because of the interconnecting spokes 209 which maintain a definite fixed relationship between the roller cages 207 and 208. When the rollers 201 are in lock-up position the rollers 206' will be held in neutral position by the cage 207 and similarly, when the rollers 206' are in lock-up position rollers 201 will be held in neutral by cage 208.

The drive in second passes from pinion 90 through gear 96, countershaft cluster member 97 and gear 106, thence to gear 109 which is clutched to shaft 93 through sleeve Q, thence to tail shaft 103 through planetary gearset G which is locked up to rotate as a unit and is therefore splined to the shaft 103 at 190 and 204. This drive is a two-way drive, sleeve 192 overrunning the reaction member 194 through the intermediary of the rollers 201 and the clutch member K is maintained in engaged position by the oil pressure at motor M which holds rod 218 and shift yoke 205 forwardly. The engine is used as a brake during coast in second speed ratio, the car driving the engine approximately twice the speed of the tail shaft 103 for the particular gear size illustrated.

Coasting in second speed below 10 M. P. H. causes the low speed governor switch X to close thereby energizing the relay N which in turn energizes the solenoid J and adjusts the valve V from the Fig. 15 position to the Fig. 16 position and vents motor M. However, as the teeth of clutch member K are loaded during coast, the clutch member K will not move rearwardly to its released position under the influence of the spring 224 until the torque through the transmission is reversed by depressing the accelerator pedal to cause the engine to drive the car. When this takes place, spring 224 acts to move rod 218, shift yoke 205 and clutch member K rearwardly as a unit back to the position shown in Figs. 9 and 19 so that the car acceleration under such conditions will automatically take place in low or first speed ratio. Of course, if the car coast in second speed ratio does not go below 10 M. P. H. then the low speed governor switch X remains closed and the acceleration of the car will then take place in second without shifting back to low.

In shifting from second speed ratio to the high range several different results may be obtained depending for the most part upon the car speed, which different results are controlled by operation of the governor controlled switch X. Incidentally, it is desired to point out that the functioning of the governor switch X is the same in second as in first or low speed ratio because the shaft 213 is driven from the tail shaft 103.

Assuming that the car is driven at a speed below 10 M. P. H. in second so that the switch X closes to energize solenoid J, then when the driver depresses clutch pedal 84 (switch L being without function in this instance as the solenoid is already energized) to release the main clutch C, he may then move the manual selector lever 165 rearwardly to the high range position to cause the shift sleeve Q to move forwardly and effect a blocker synchronizing shift to clutch with teeth 101 of gear 90 whereby this gear is directly drivingly connected with the intermediate shaft 93 through the sleeve Q and the hub 104. The driver then releases the clutch pedal 84 and depresses the accelerator pedal to drive the car in third speed ratio. The clutch member K will be released in this instance because the switch X maintains the solenoid J energized and a reversal of torque occurs when the clutch C is released to unload the teeth of sleeve Q. The drive in third takes place from the main pinion 90 to the shaft 93 through sleeve Q and hub 104 thence to the shaft 103 through the annulus gear 185, planet gears 186 and planet carrier 189, the sun gear 191 being locked to the casing 180 through the intermediary of the overrunning device E and the reaction taking member 194.

If, on the other hand, the car is driven above 10 M. P. H. in second then the low speed switch X will remain open and the solenoid will remain de-energized to maintain the valve V in its Fig. 15 condition so that pressure fluid will be supplied to the motor M thereby holding clutch member K in forward position. In shifting to the high range under these conditions, the driver presses the clutch pedal 84 which first closes switch L to energize relay N and solenoid J and vent motor M and then releases main clutch C. The driver then shifts the selector lever 165 rearwardly to the high range as before, to clutch sleeve Q with gear 90 and under these conditions the shift to high range will be made under one of the following conditions:

Firstly, as the driver releases the clutch pedal 84 while maintaining the accelerator 59 depressed so that the throttle is opened prior to engagement of main clutch C then third speed is obtained because the blocker 210 will lag and block clutch member K prior to de-energizing solenoid J as switch L opens to restore the valve V to the Fig. 15 position of supplying pressure fluid to the motor M. Under such conditions the car will be driven in third speed ratio with the clutch member K blocked against forward movement as shown in Fig. 9.

Secondly, if the driver releases the clutch pedal 84 prior to depressing the accelerator pedal 59 then the third speed drive is also obtained when the accelerator pedal is depressed because, although in engaging main clutch C the switch L opens to de-energize solenoid J and permits the clutch member K to move forwardly, the blocker 210 lags behind the shaft 103 at this time and thus be blocked from engagement.

Under all of the above conditions, the switch R is opened for an instant when the rail 113 passes through neutral, thus opening the relay circuit. Ordinarily this will have no effect upon the position of the parts because of the short period within which switch R is opened and closed.

When driving in third speed ratio above 10 M. P. H., the switch X is open and the solenoid J is de-energized, therefore direct drive will automatically be obtained when the accelerator pedal is released to accommodate synchronous clutching of the clutch member K. Under such conditions there is no free wheeling in the ordinary sense, the overrunning clutch E allowing the engine and shaft 93 to drop to the speed of the shaft 103 whereupon the clutch member K will engage the sun gear sleeve 192 and lock up the planetary train G as before described.

Direct drive is a two-way drive and passes from pinion 90 directly to the shaft 93 through the sleeve Q and the hub 104 and thence directly to the shaft 103 through the planetary set G which is locked up to rotate as a unit. If the car is allowed to coast below 10 M. P. H. the governor control switch X will close and the solenoid J will be energized so that when the accelerator pedal is depressed the teeth 193, 203 will be unloaded and the clutch member K will be shifted rearwardly thereby providing drive in third speed.

If desired, the car may be started from rest in third speed by releasing the main clutch C and shifting the selector lever 165 rearwardly to high range. The solenoid J will be energized by action of the switch R and, on releasing the clutch pedal 84 and depressing the accelerator pedal, the car will be accelerated in third speed, the blocker 210 lagging behind the clutch member K and preventing its shift forwardly during acceleration of the car in third speed above the speed at which the switch X will open, viz., above 10 M. P. H. Direct drive will then result from releasing the accelerator pedal to synchronize clutch member K with sleeve 192 as before.

The kickdown control functions to step down the drive from direct to third or from second to first, depending on the position of the manual shift lever 165 and sleeve Q.

Assuming that the car is being driven in direct drive above the critical speed of the low speed control switch X, namely, above 10 M. P. H., then the drive may obtain third speed by depressing the accelerator pedal 59 beyond the normal throttle opening range thereof and through the kickdown range which over-travels the wide open throttle position. The kickdown switch 77 is thereby closed to energize relay N and solenoid J and operate valve V from the Fig. 15 position to the Fig. 16 position and thereby vent motor M. Since the pressure fluid to the motor M is released, the plunger 264 of switch S (Fig. 21) moves forwardly, the contact ring 269 thereof momentarily contacting the plungers 260—261 at which instant the switches 77 and S are both closed. The engine ignition is thus grounded at 319 through the wires 317a, 317b, 321 and 322 thereby effecting a reversal of torque through the transmission, as the car drives the engine. The cylinder 226 of motor M being vented and the teeth of clutch engine K being momentarily unloaded from their immediately preceding condition of driving teeth 193, the spring 224 operates to move the rod 218 and shift yoke 305 rearwardly to the Fig. 9 position. As the piston 227 approaches the end of its rearward stroke it strikes the reduced end portion 265 of the plunger 264 of switch S and moves the plunger rearwardly of the casing 255. This action effects a second momentary grounding of the ignition as the ring 269 wipes the contacts 260, 261 but as the clutch member K is already released, this has no effect on the operation of the transmission. The grounding in any case is of extremely short duration and is unnoticeable to the driver. The engine rapidly speeds up to engage the overrunning clutch E thereby providing reaction for the sun gear 191 and causing a reduction drive through the planetary gear set G, the car then being driven in third speed.

This whole cycle of kickdown takes place rapidly and smoothly and is entirely responsive to the natural movement of the accelerator pedal 59 down to kickdown range. The kickdown is conveniently used as a fast acceleration drive for rapidly passing another car in traffic, to obtain more favorable torque modification for hill climbing, etc. Release of the accelerator pedal will cause the direct driving condition to be automatically synchronously re-established. By preference the direct drive is not re-established after kickdown until the accelerator pedal 59 is substantially fully released as when finger 74 operates switch on 76. This prevents undesired cyclic operations of the kickdown mechanism and changes in the speed ratio within a narrow range of accelerator pedal movement, therefore the kickdown switch 77 when closed maintains the solenoid J energized and the valve V in the Fig. 16 position until the accelerator is approximately fully released.

When driving the car in the second speed ratio above 10 M. P. H. the accelerator pedal 59 may be depressed through the kickdown range to effect release of the clutch pedal K as above described and the car will be driven in first, as will be readily understood. In a like manner, second speed may be re-established upon release of the accelerator pedal to substantially fully released position.

The car may be driven in reverse by the driver releasing the main clutch C and shifting the selector lever 165 from neutral upwardly and then rearwardly to mesh reverse idler gear 118 with the gears 108 and 121 respectively. During reverse driving, the switch R is open, the plunger 360 thereof being engaged by the forward end portion 113' of the shifter rail 113 which of course remains in neutral position. The switch R consists of a casing 359 fastened to the cover 145 of the transmission casing 89 by a bolt 358. The casing carries a pair of insulated contact terminals to which the wires 316 and 316' are respectively connected (Figs. 11 and 24). A plate-like contact element 361 is normally urged by a spring 362 into contact with the said contact terminals thereby closing the circuit between the wires 316 and 316'. Upon manipulating the transmission into neutral setting, the portion 113' of the shifter rail 113 engages the plunger 360 and moves the element 361 out of contact with the contact terminals to break the circuit between the wires 316 and 316' and interrupt the circuit of the relay N which causes the solenoid J to become de-energized and to remain in this condition so long as the rail 113 is in neutral position. The reverse drive passes from a pinion 90 to countershaft cluster 97 then through gears 108, 118 and 121 to the intermediate shaft 93 which now rotates in a counterclockwise direction looking rearwardly of the vehicle. The shaft 103 will therefore be rotated counterclockwise and the clearance 211 between the shaft 103 and the blocker element 210 will be taken up thereby permitting the clutch member K to be shifted into engagement with the teeth 193 under the influence of the spring 222, the said spring having been previously loaded by forward movement of the piston 227 in the cylinder 226 by action of the solenoid J, which was de-energized when the switch R was open by contact of the plunger 360 thereof by the rail 138. The reverse drive is therefore a direct drive so far as the planetary gearing G is concerned, this unit being locked up to rotate as a unit upon opening of the switch R, or immediately as the vehicle starts to drive in reverse should the engagement of the clutch member K with the teeth 193 be prevented by dead ending.

It is sometime desirable to be able to start the engine by towing the car and provision has been made for this so that the engine may be driven (by the car) with sleeve K engaged even below the speed at which the switch X would normally maintain the solenoid J de-energized. Under these conditions the dash switch 318 is manually operated to cut out the governor switch X and the clutch pedal switch L. The driver may then release main clutch C without energizing solenoid J and select the high speed ratio by moving selector lever 165 rearwardly. With the clutch pedal 84 in its depressed position the car may be towed or pushed and the pump P will operate to build up pressure fluid as the gear 107 is driven by means of the shaft 103, planetary unit G, shaft 93, sleeve Q and pinion 90. When the pressure fluid enters motor M the clutch member K will be forced forwardly and as the blocker 210 is in non-blocking position (the rollers 206' being engaged) the clutch member will engage. The main clutch C may be engaged at any time to turn the engine over and no "hunting" of the clutch member K will occur. This feature prevents possible damage to the parts by cyclic operation of the relay N, etc.

After the engine has been started the driver closes switch 318 to restore the normal control system.

The transmission arrangement is such that undesired backward roll of the car is prevented. For example, when driving up hill in second and direct the clutch member K is of course clutched into engagement with the sleeve 192 and will not be disengaged if the car comes to a stop with the engine continuously pulling, because the fluid coupling D continues to slip and there is no possibility of the direction of torque through the transmission being reversed. The engine continues to exert its torque on the clutch member K and the foregoing functions produce the effect of a "no-back."

In general, it may be noted that the governor switch X directs the shift from fourth or second into third or first when the car slows down somewhat below the opening speed of the switch due to the friction lag effect, energizing the solenoid J and venting motor M, whereby spring 224 disengages clutch member K under light coasting torque. This provides a stepdown to a slower transmission speed automatically on coastdown in direct or second for rapid starting in third or first without releasing the main clutch C, and with the fluid coupling D advantageously contributing to the accelerating characteristics of the car. Any tendency of the car to creep while at rest with the transmission in third or first may be prevented by a light application of the regular vehicle brakes.

The governor switch X in conjunction with the fluid switch S, functions to prevent interruption of the engine ignition circuit by kickdown operation of switch 77 below a vehicle speed where the engine might have a tendency to stall. Where a fluid coupling is employed there is a tendency for the engine to stall if the ignition is interrupted at very low speed. With the present arrangement stalling tendency is prevented because, at low speeds, namely below 10 M. P. H., the governor controlled switch X closing to energize the solenoid J thereby venting motor M and causing piston 227 to maintain switch S in open position (as shown in Fig. 21) by direct contact with the reduced end portion 265 of the switch plunger 264 and, as the switch S is in series with the kickdown switch 77 in the kickdown ignition interrupting circuit, operation of the switch 77 at low speeds cannot close this circuit and stalling of the engine is prevented.

The governor switch X furthermore functions to prevent the car from tending to get into a locked up condition as when, for example, the car is driven into an obstacle such as a wall under driving load with the clutch member K engaged and the car bumpers applying backward loading of the car. Clutch member K would thus still be loaded thereby preventing shifting the transmission out of forward condition by manipulation of manually shiftable sleeve Q. Forward drive of the car is of course impossible under these conditions and the transmission would be locked up within itself. Under these conditions the switch X serves to rapidly vent motor M thereby permitting disengagement of clutch member K.

The governor mechanism H has another important function. The switch finger 285 thereof is so proportioned that at a relatively high car speed, say in the neighborhood of 55 or 60 M. P. H., this finger will, in a manner similar to the operation of the switch finger 284 at low car speeds, raise the contact 289 away from contact with the fixed switch contact 290. As the car accelerates from rest the switch X therefore first opens at approximately 10 M. P H. car speed and stays open above this speed. When the car reaches 60 M. P. H. then the switch Y opens and breaks the kickdown circuit to thereby render the kickdown mechanism inoperative. This prevents operation of the kickdown mechanism at high speeds when operation of such would produce an increase in engine R. P. M. without any increase in torque.

It is of course obvious that the governor mechanism H may be adjusted to change the critical speeds at which both or either of the governor controlled switches X and Y will function. In the present transmission the low speed governor controlled switch X is preferably adjusted to open and close at a car speed of approximately 10 M. P. H., this having been found to give step-up and step-down characteristics which are in general similar to those encountered in manually shiftable transmissions. The high speed governor control switch Y has been set to function at a car speed of approximately 60 M. P. H. but this particular critical operating speed may be adjusted upwardly or downwardly according to the desires of the driver or to accommodate different driving characteristics of the apparatus.

Figure 26:
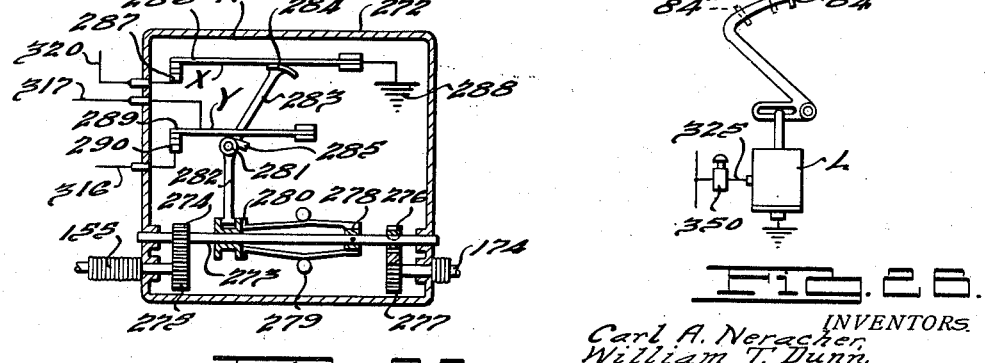
Fig. 26 is a diagrammatic view of a portion of the Fig. 24 diagram illustrating a modified control arrangement.

Fig. 26 illustrates a modification of the control system illustrated in Fig. 24 which comprises the provision of a second dash control switch 350 located in the wire 325 between the wire 321 and the clutch pedal control switch L, instead of in the wire 317b which latter will not, under these conditions, be interrupted. In Fig. 26 the dash switch 350, when left closed, will cause the transmission to operate throughout its four speed ratios exactly as set forth in the foregoing description. When the switch 350 is open to cut out the clutch pedal control switch L then the functions of the transmission are slightly altered as follows:

First, all of the conditions of car towing to start the engine will be slightly altered in that in Fig. 26 the dash switch 350 now cuts out only the clutch pedal switch L and not the governor mechanism H so that the car must be towed above the critical speed of the switch X to open such switch and de-energize solenoid J. Secondly, as the clutch pedal of Fig. 26 now no longer functions to energize solenoid J, it will be apparent that when the manually shiftable sleeve Q is shifted rearwardly the car will start in low as before and then automatically shift into second on coast by engagement of the automatically shiftable clutch member K. Now when the manually shiftable sleeve Q is shifted forwardly, the clutch pedal 84 being operated, the solenoid J is not now energized and the clutch member K will remain engaged, thus providing a shift from second into direct without including third. Third speed, however, may be brought into action for acceleration purposes by kickdown of the accelerator pedal 58, causing the clutch member K to release while the manually shiftable sleeve Q remains in its forward position. Third speed is also available as a starting ratio with automatic shift to direct on coast. The latter condition provides convenient operating condition for use under traffic conditions when it is not necessary to start under heavy load and when extremely fast acceleration is not desired. When driving under such conditions, the driver may leave the manually shiftable sleeve Q in forward position thereby making a direct drive relationship between the shaft 83 and the intermediate shaft 93 and the car may be brought to a stop, at a traffic light for instance, by simply releasing the accelerator pedal 59 and applying the vehicle brakes. As the car comes to a stop the switch X will close thereby venting the motor M and disengaging the clutch member K under low coasting torque. The car may be held at rest without operation of clutch pedal 84 simply by light application of the brakes, the fluid coupling B accommodating such action because of its inherent slipping characteristics. The driver may then resume operation of the car simply by releasing the brakes and depressing the accelerator 59 momentarily after a speed of 10 M. P. H. has been obtained whereupon the clutch member K will effect a blocker synchronizing shift into engagement with the sleeve 192 as aforesaid.

Figs. 27 and 28 illustrate a modified form of the invention wherein an overrunning clutch is provided between the gear 121 and the intermediate shaft 93 thereby eliminating the necessity for the shifter rail operated switch R. As can be seen from Fig. 27, the gear 121 is formed with a rearwardly extending hub 363 which engages the under side of the lubricating slip ring 244 and the inner cylindrical surface of which forms one element of an overrunning clutch device having rollers 264. The other element of the overrunning clutch device 365 is splined in shaft 93 and has an external cam 366 formed thereon which cam is adapted to lock the rollers 364 into engagement with the internal cylindrical surface of the gear 121 upon rotation of said gear counterclockwise as indicated in Fig. 28 to establish a reverse drive.

By providing an overrunning drive between the gear 121 and the shaft 93, danger of breakage in the transmission due to shock caused by reversal of torque during reverse driving is eliminated. Without the switch R in the control circuit, shifting of the transmission into reverse will of course be accompanied by venting of the motor M by means of switch L, thereby moving the clutch member K to its disengaged position. Acceleration of the vehicle in reverse will then cause the shafts 93 and 103 to be driven in a direction opposite to that indicated by the arrows in Figs. 22 and 23. Under these conditions, the reverse drive will be a direct drive through the planetary gearset G because the sun gear 191 will be locked to the shaft 103 by the inner overrunning device F. Due to the fact that the shaft 103 is driven in a counterclockwise direction looking from front to rear of the vehicle, the clearance at the splines 211 will be taken up and the blocker will immediately assume a non-blocking position. As soon as the predetermined speed of approximately 10 M. P. H. has been reached, the spring 222 will be loaded by forward movement of the piston 227 thereby moving the clutch member K forwardly. The teeth 203 of the clutch member K may not, however, immediately engage the teeth 193 of the sleeve 192 because of dead ending. Under such a condition, should the driver remove his foot from the accelerator pedal during reverse driving, thereby causing a reversal of torque through the transmission, such reversal of torque will cause the annulus gear 185 to drop in speed and become the temporary reaction member of the gearset G thus producing an immediate acceleration of the rotational speed of the sun gear 191 because of the multiplication through the planet gears 186. This will cause rollers 201 of overrunning device E to lock the sleeve 192 to the reaction taking member 194. In the absence of some means to release the drive, this sudden lock-up of the sun gear may produce a shock of sufficient intensity to damage the parts in spite of the action of the cushion springs 197.

By providing an overrunning drive connection between the gear 121 and shaft 93, locking up of the outer overrunning unit E will then cause a barely perceptible shock due to the fact that the shaft 93 may release itself through the action of the overrunning rollers 364 and rotate freely at the speed of the annulus gear 185.

If desired, the switch R may be included in the control circuit even when the modification just described is used. However, under ordinary circumstances either the switch R or the overrunning drive connection may be used alone.

Figure 29:
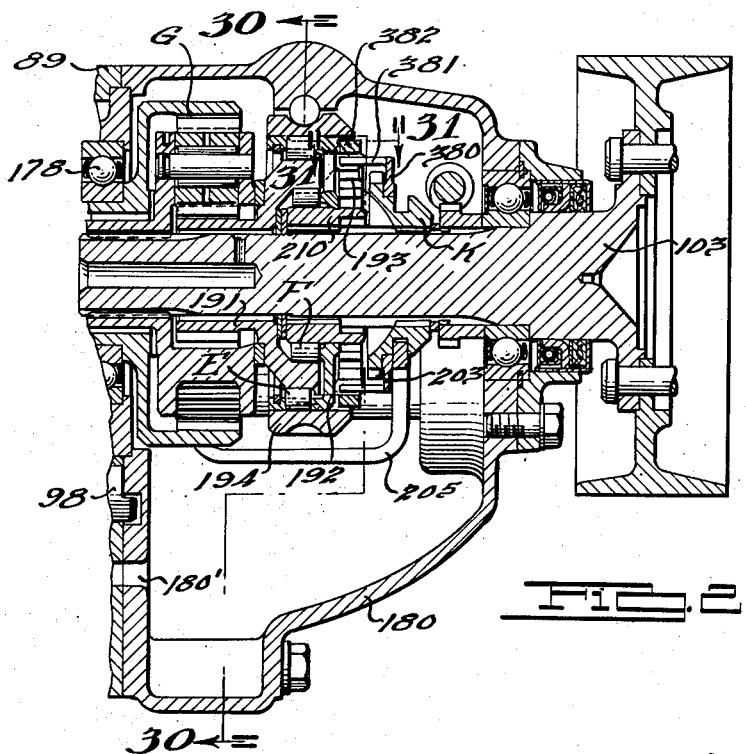
Fig. 29 is a fragmentary sectional view of a further modification.
Figures 30, 31:
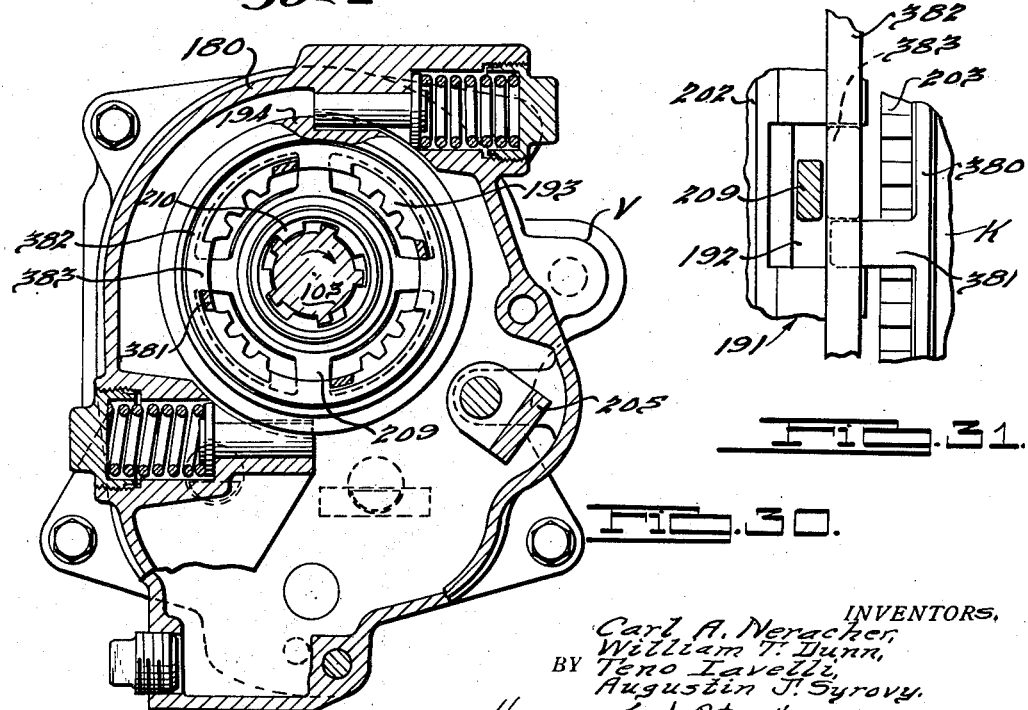
Fig. 30 is a sectional view along line 30—30 of Fig. 29.
Fig. 31 is a sectional view along line 31—31 of Fig. 29.

Figs. 29, 30 and 31 illustrate a modification of the invention which includes a mechanism operable upon clutching movement of clutch member K for positively locking the overrunning devices E and F in such position that the rollers 206' are locked in driving position and the rollers 201 are free, thus permitting the member 192 to rotate freely. This prevents the planetary unit G from becoming locked up between the teeth 193 and the rollers 201 of the overrunning device F which might accidentally occur under certain conditions of operation, especially during reverse driving as aforesaid. As explained earlier in this specification, the clutch member K engages the teeth 193 upon shifting of the transmission mechanism into reverse, or immediately thereafter upon slight opening of the vehicle throttle. In order to prevent lock-up of the planetary unit G and to make sure that the rollers of the overrunning devices E and F are in their correct positions, the shiftable clutch member K is provided with a ring 380 which has a plurality of fingers 381 projecting forwardly therefrom. In the present structure there are four fingers which are respectively adapted to enter the spaces between the spokes 209 of the overrunning cage and one side of the rearwardly projecting portions of the sun gear control sleeve 192.

As can be seen from Figs. 29, 30 and 31, the fingers 381 project forwardly into contact with the rearwardly projecting portions 192 of the sun gear control sleeve during the time that the clutch member K is in its disengaged position. The ring 380 is mounted on the clutch member K in such manner that it may rotate relatively thereto but is movable with the clutch member K, the shifter yoke 205 locking the ring 380 against longitudinal movement with respect to the clutch member K as shown in Fig. 29. In order that the fingers 381 may always be in such position that they will engage the spokes 209 on the rearward side thereof, as seen in Fig. 30, and not on the forward or leading side, a synchronizing guide ring 382 having inwardly projecting guide portions 383 is provided. This ring is pressed in place on the outer periphery of the sleeve projections 192 after the overrunning devices and the reaction member 194 have been assembled in place. As can be more clearly seen from Figs. 30 and 31, the depending guide portions 383 maintain the fingers 381 in a predetermined fixed position relative to the sleeve 192, this position being such that the fingers 381 will enter the space between the rearward or trailing side of the spokes 209 and the rearwardly projecting portions 192 of the sleeve upon clutch engaging movement of the clutch member K.

Fig. 30 corresponds to Fig. 14 but differs therefrom in that the shaft 103 is shown rotating clockwise. This is the condition which obtains when the transmission mechanism is set for reverse driving. Under such conditions, the shaft 103 rotates clockwise and takes up the clearance between the splines of the blocker member 210 and the shaft splines, thus causing the blocker member 210 to assume a non-blocking position with respect to the clutch member K. Upon forward movement of the clutch member K into engagement with the teeth 193 of the sun gear sleeve, the fingers 381 will enter the spaces between the spokes 209 and the sleeve portions 192 to thus lock the cage of the overrunning devices E and F in such position that the rollers 201 may rotate freely permitting the sun gear to rotate in a counterclockwise direction, as viewed in Fig. 22, without danger of accidental lock-up between the members 192 and 194.

While the device illustrated in Figs. 29 to 31 inclusive is not absolutely necessary for operation of the transmission, it has been found desirable to make certain that accidental lock-up of the planetary unit G and its control mechanism during reverse driving with consequent damage to the transmission elements will not occur under any circumstances.

We do not limit our invention in its broader aspects thereof to any particular combination and arrangement of parts such as shown and described herein for illustrative purposes only, since various modifications will be apparent to those skilled in the art from the teachings of our invention and scope thereof as defined in the claims.

We claim:

1. In a motor vehicle having a driving shaft adapted to receive drive from the engine and a driven shaft adapted to drive the vehicle; an intermediate shaft for transmitting drive between said driving and driven shafts; a set of clutch teeth operatively associated with said intermediate shaft; a clutch member operable at the will of the vehicle driver and adapted to engage said clutch teeth for directly connecting said intermediate shaft with said driven shaft; reduction drive means, including an overrunning clutch interposed therein, adapted to operably drivingly connect said intermediate shaft and said driven shaft for driving said driven shaft at a reduced speed relative to said intermediate shaft, said overrunning clutch automatically releasing the reduction drive in response to coast of the driving shaft; power means for shifting said clutch member into engagement with said teeth when the speeds of said clutch member and said teeth are approximately synchronous; an overrunning clutch drivingly connecting said clutch member and said teeth in such manner that said teeth may rotate faster but not slower than said clutch member; and blocker means operably associated with said clutch member to block clutching shift thereof by said power means when said teeth are rotating faster than said clutch member, and to release said clutch member for clutching shift thereof into engagement with said teeth by said power means when the intermediate shaft is allowed to coast down into synchronism with said driven shaft by overrun of the members of the first said overrunning clutch.

2. In a motor vehicle having a driving shaft adapted to receive drive from the engine and a driven shaft adapted to drive the vehicle; an intermediate shaft for transmitting drive between said driving and driven shafts; a set of clutch teeth operatively associated with said intermediate shaft; a clutch member operable at the will of the vehicle driver and adapted to engage said clutch teeth for directly connecting said intermediate shaft with said driven shaft; reduction drive means, including an overrunning clutch interposed therein, adapted to operably drivingly connect said intermediate shaft and said driven shaft for driving said driven shaft at a reduced speed relative to said intermediate shaft, said overrunning clutch automatically releasing the reduction drive in response to coast of the driving shaft; power means for shifting said clutch member into engagement with said teeth when the speeds of said clutch member and said teeth are approximately synchronous; an overrunning clutch drivingly connecting said clutch member and said teeth in such manner that said teeth may rotate faster but not slower than said clutch member; and blocker means operably associated with said clutch member to block clutching shift thereof by said power means when said teeth are rotating faster than said clutch member, and to release said clutch member for clutching shift thereof into engagement with said teeth by said power means when the intermediate shaft is allowed to coast down into synchronism with said driven shaft by overrun of the members of the first said overrunning clutch; the said blocker means comprising a member carried by said driven shaft and capable of a slight movement relative thereto to and from blocking position; and means for automatically moving said blocker member to unblocking position upon coast of said vehicle.

3. In a motor vehicle having a driving shaft adapted to receive drive from the engine and a driven shaft adapted to drive the vehicle; an intermediate shaft for transmitting drive between said driving and driven shafts; a set of clutch teeth operatively associated with said intermediate shaft; a clutch member operable at the will of the vehicle driver and adapted to engage said clutch teeth for directly connecting said intermediate shaft with said driven shaft; reduction drive means, including an overrunning clutch interposed therein, adapted to operably drivingly connect said intermediate shaft and said driven shaft for driving said driven shaft at a reduced speed relative to said intermediate shaft, said overrunning clutch automatically releasing the reduction drive in response to coast of the driving shaft; power means for shifting said clutch member into engagement with said teeth when the speeds of said clutch member and said teeth are approximately synchronous; and a blocker member operably associated with said clutch member to block clutching shift thereof by said power means when said teeth are rotating faster than said clutch member, and to release said clutch member for clutching shift thereof into engagement with said teeth by said power means when said intermediate shaft is allowed to coast down into synchronism with said driven shaft by overrun of the members of said overrunning clutch; and automatically operable means for moving said blocker member into unblocking position upon coast comprising a second overrunning clutch.

4. In a motor vehicle having a driving shaft adapted to receive drive from the engine and a driven shaft adapted to drive the vehicle; an intermediate shaft for transmitting drive between said driving and driven shafts; a set of clutch teeth operatively associated with said intermediate shaft; a clutch member operable at the will of the vehicle driven and adapted to engage said clutch teeth for directly connecting said intermediate shaft with said driven shaft; reduction drive means, including an overrunning clutch interposed therein, adapted to operable drivingly connect said intermediate shaft and said driven shaft for driving said driven shaft at a reduced speed relative to said intermediate shaft, said overrunning clutch automatically releasing the reduction drive in response to coast of the driving shaft; power means for shifting said clutch member into engagement with said teeth when the speeds of said clutch member and said teeth are approximately synchronous; and a blocker member operably associated with said clutch member to block clutching shift thereof by said power means when said teeth are rotating faster than said clutch member, and to release said clutch member for clutching shift thereof into engagement with said teeth by said power means when said intermediate shaft is allowed to coast down into synchronism with said driven shaft by overrun of the members of said overrunning clutch; and automatically operable means for moving said blocker member into unblocking position upon coast comprising a second overrunning clutch; said overrunning clutches having a common control element so arranged that one clutch is maintained in overrunning position during the period the other of said clutches is driving.

5. In a motor vehicle having a driving structure adapted to receive drive from the engine and a driven structure adapted to drive the vehicle; relatively slow speed driving means for driving the driven structure from the driving structure comprising a planetary gearset; an overrunning device for locking the reaction element of said planetary gearset against rotation to establish said slow speed drive; a shiftable clutch member carried by said driven structure and adapted for clutching engagement with said reaction element to establish a direct drive between said structures; means operably associated with said clutch member for controlling shift thereof as a function of the relative speeds of said structures such that said clutch member is prevented from engaging said reaction element during operation of said slow speed drive but is free to engage therewith during coast of said structures; a motor operable to shift said clutch member and a lost motion operating connection between said motor and said clutch member such that the motor may operate prior to drive-establishing shift of said clutch member as aforesaid.

6. In a motor vehicle having a driving structure adapted to receive drive from the engine and a driven structure adapted to drive the vehicle; relatively slow speed driving means for driving the driven structure from the driving structure comprising a planetary gearset; an overrunning device for locking the reaction element of said planetary gearset against rotation to establish said slow speed drive; a shiftable clutch member carried by said driven structure and adapted for clutching engagement with said reaction element to establish a direct drive between said structures; means operably associated with said clutch member for controlling shift thereof as a function of the relative speeds of said structures such that said clutch member is prevented from engaging said reaction element during operation of said slow speed drive but is free to engage therewith during coast of said structures; a motor operable to shift said clutch member and a lost motion operating connection between said motor and said clutch member such that the motor may operate prior to drive-establishing shift of said clutch member as aforesaid; a plurality of independently operable control elements adapted for selective actuation by the vehicle driver; and a plurality of means respectively operated in response to driver actuation of said control elements for rendering said motor inoperative.

7. In a motor vehicle having a driving structure adapted to receive drive from the engine and a driven structure adapted to drive the vehicle; relatively slow speed driving means for driving the driven structure from the driving structure comprising a planetary gearset; an overrunning device for locking the reaction element of said planetary gearset against rotation to establish said slow speed drive; a shiftable clutch member carried by said driven structure and adapted for clutching engagement with said reaction element to establish a direct drive between said structures; means operably associated with said clutch member for controlling shift thereof as a function of the relative speeds of said structures such that said clutch member is prevented from engaging said reaction element during operation of said slow speed drive but is free to engage therewith during coast of said structures; means for shifting said clutch member; a plurality of independently operable control elements adapted for selective actuation by the vehicle driver; and a plurality of means respectively operating in response to driver actuation of said control elements for controlling said shifting means to effect release of said clutch member thereby reestablishing said slow speed drive.

8. In a motor vehicle drive having a driving structure adapted to receive drive from the engine and a driven structure adapted to transmit drive from the driven structure for driving the vehicle;

reduction driving means comprising a planetary gearset including a reaction element; an overrunning device for locking said reaction element against rotation to establish said reduction drive; a drive controlling clutch member carried by said driven structure and shiftable into clutching engagement with said reaction element to thereby establish direct driving relationship between said structures; said overrunning device automatically releasing said reaction element upon coast of the structures to permit said driven structure to overrun said driving structure; blocker means operably associated with said shiftable clutch member for preventing clutching shift of said member while the speeds of said structures are asynchronous while permitting clutching shift thereof when the speeds of said structures become synchronous; a motor operable to shift said clutch member; and a lost motion operating connection between said motor and said clutch member whereby the motor may operate in advance of drive-establishing shift of said clutch member.

9. In a motor vehicle drive having a driving structure adapted to receive drive from the engine and a driven structure adapted to transmit drive from the driven structure for driving the vehicle; reduction driving means comprising a planetary gearset including a reaction element; an overrunning device for locking said reaction element against rotation to establish said reduction drive; a drive controlling clutch member carried by said driven structure and shiftable into clutching engagement with said reaction element to thereby establish direct driving relationship between said structures; said overrunning device automatically releasing said reaction element upon coast of the structures to permit said driven structure to overrun said driving structure; blocker means operably associated with said shiftable clutch member for preventing clutching shift of said member while the speeds of said structures are asynchronous while permitting clutching shift thereof when the speeds of said structures become synchronous; a motor operable to shift said clutch member; and a lost motion operating connection between said motor and said clutch member whereby the motor may operate in advance of drive-establishing shift of said clutch member; a plurality of independently operable control elements adapted for selective actuation by the vehicle driver; and a plurality of means respectively operating in response to driver actuation of said control elements for rendering said motor inoperative.

10. In a motor vehicle drive having a driving structure adapted to receive drive from the engine and a driven structure adapted to transmit drive from the driven structure for driving the vehicle; reduction driving means comprising a planetary gearset including a reaction element; an overrunning device for locking said reaction element against rotation to establish said reduction drive; a drive controlling clutch member carried by said driven structure and shiftable into clutching engagement with said reaction element to thereby establish direct driving relationship between said structures; said overrunning device automatically releasing said reaction element upon coast of the structures to permit said driven structure to overrun said driving structure; blocker means operably associated with said shiftable clutch member for preventing clutching shift of said member while the speeds of said structures are asynchronous while permitting clutching shift thereof when the speeds of said structures become synchronous; means for shifting said clutch member; a plurality of independently operable control elements adapted for selective actuation by the vehicle driver; and a plurality of means respectively operating in response to driver actuation of said control elements for controlling said shifting means to effect release of said clutch member thereby changing the drive from direct drive to reduction drive.

11. In a motor vehicle drive having a driving structure adapted to receive drive from the engine and a driven structure adapted to transmit drive from the driven structure for driving the vehicle; reduction driving means comprising a planetary gearset including a reaction element; an overrunning device for locking said reaction element against rotation to establish said reduction drive; a drive controlling clutch member carried by said driven structure and shiftable into clutching engagement with said reaction element to thereby establish direct driving relationship between said structures; said overrunning device automatically releasing said reaction element upon coast of the structures to permit said driven structure to overrun said driving structure; blocker means operably associated with said shiftable clutch member for preventing clutching shift of said member while the speeds of said structures are asynchronous while permitting clutching shift thereof when the speeds of said structures become synchronous; a motor operable to shift said clutch member; a yielding operating connection between said motor and said clutch member urging shift of the latter in response to operation of said motor; a driver operated means for controlling operation of the engine; and means operable in response to driver operation of said engine controlling means for controlling operation of said motor.

12. In a motor vehicle drive having a driving structure adapted to receive drive from the engine and a driven structure adapted to transmit drive from the driven structure for driving the vehicle; reduction driving means comprising a planetary gearset including a reaction element; an overrunning device for locking said reaction element against rotation to establish said reduction drive; a drive controlling clutch member carried by said driven structure and shiftable into clutching engagement with said reaction element to thereby establish direct driving relationship between said structures; said overrunning device automatically releasing said reaction element upon coast of the structures to permit said driven structure to overrun said driving structure; blocker means operably associated with said shiftable clutch member for preventing clutching shift of said member while the speeds of said structures are asynchronous while permitting clutching shift thereof when the speeds of said structures become synchronous; a motor operable to shift said clutch member; a lost motion operating connection between said motor and said clutch member such that the motor may operate prior to drive-establishing shift of said clutch member as aforesaid; driver operated means for adjusting the throttle valve of said engine; and means operable in response to driver operation of said throttle valve adjusting means for controlling operation of said motor.

13. In a motor vehicle drive having a driving structure adapted to receive drive from the engine and a driven structure adapted to transmit drive from the driven structure for driving the vehicle; reduction driving means comprising a planetary gearset including a reaction element; an overrunning device for locking said reaction element against rotation to establish said reduction drive; a drive controlling clutch member carried by said driven structure and shiftable into clutching engagement with said reaction element to thereby establish direct driving relationship between said structures; said overrunning device automatically releasing said reaction element upon coast of the structures to permit said driven structure to overrun said driving structure; blocker means operably associated with said shiftable clutch member for preventing clutching shift of said member while the speeds of said structures are asynchronous while permitting clutching shift thereof when the speeds of said structures become synchronous; a motor operable to shift said clutch member; a lost motion operating connection between the motor and said clutch member such that the motor may operate prior to drive-establishing shift of said clutch member as aforesaid; a throttle valve for said engine; driver operated means for adjusting said valve; and means operable in response to drive operation of said throttle valve adjusting means for coincidentally rendering said motor inoperative and momentarily interrupting delivery of power from the engine to the driving structure for unloading said clutch member.

14. In a power transmission for driving a vehicle having an engine provided with a throttle valve; an accelerator pedal operable by the vehicle driver; means operably connecting said accelerator pedal with said throttle valve accommodating movement of said accelerator pedal through a primary range for adjusting the throttle between its fully closed and opened positions and through a secondary range overtraveling the primary range; a driving structure adapted to receive drive from the engine; a driven structure adapted to transmit drive from the driving structure for driving the vehicle; relatively slow speed driving means including a reaction member and an overrunning device operably associated therewith for driving the driven structure from the driving structure; relatively fast speed driving means including a shiftable clutch member for driving the driven structure from the driving structure at a speed ratio faster than that provided by said slow driving means; said overrunning device locking said reaction member against rotation in the direction of its rotational tendency during said slow speed drive and automatically operable to release said reaction member for rotation in the opposite direction upon coast of said structures; means operably associated with said clutch member for controlling shift thereof as a function of the relative speeds of said structures such that said clutch member is prevented from shifting to establish operation of said fast driving means during operation of said slow driving means, but is free to shift to establish operation of said fast driving means during synchronous rotation of said structures; a motor operable to shift said clutch member; a lost motion operating connection between the motor and said clutch member such that the motor may operate prior to drive-establishing shift of said clutch member as aforesaid; and means operable in response to driver operation of said accelerator pedal through said secondary overtravelling range for controlling operation of said motor.

15. In a power transmission for driving a vehicle having an engine provided with a throttle valve; an accelerator pedal operable by the vehicle driver; means operably connecting said accelerator pedal with said throttle valve accommodating movement of said accelerator pedal through a primary range for adjusting the throttle between its fully closed and opened positions and through a secondary range overtraveling the primary range; a driving structure adapted to receive drive from the engine; a driven structure adapted to transmit drive from the driving structure for driving the vehicle; relatively slow speed driving means including a reaction member and an overrunning device operably associated therewith for driving the driven structure from the driving structure; relatively fast speed driving means including a shiftable clutch member for driving the driven structure from the driving structure at a speed ratio faster than that provided by said slow driving means; said overrunning device locking said reaction member against rotation in the direction of its rotational tendency during said slow speed drive and automatically operable to release said reaction member for rotation in the opposite direction upon coast of said structures; means operably associated with said clutch member for controlling shift thereof as a function of the relative speeds of said structures such that said clutch member is prevented from shifting to establish operation of said fast driving means during operation of said slow driving means but is free to shift to establish operation of said fast driving means during synchronous rotation of said structures; means for shifting said clutch member; and means operable in response to driver operation of said accelerator pedal through said secondary overtraveling range for controlling said shifting means to effect release of said clutch member thereby changing the drive from the fast drive to the slow drive.

16. In a power transmission for driving a vehicle having an engine provided with a throttle valve; an accelerator pedal operable by the vehicle driver; means operably connecting said accelerator pedal with said throttle valve accommodating movement of said accelerator pedal through a primary range for adjusting the throttle between its fully closed and opened positions and through a secondary range overtraveling the primary range; a driving structure adapted to receive drive from the engine; a driven structure adapted to transmit drive from the driving structure for driving the vehicle; relatively slow speed driving means including a reaction member and an overrunning device operably associated therewith for driving the driven structure from the driving structure; relatively fast speed driving means including a shiftable clutch member for driving the driven structure from the driving structure at a speed ratio faster than that provided by said slow driving means; said overrunning device locking said reaction member against rotation in the direction of its rotational tendency during said slow speed drive and automatically operable to release said reaction member for rotation in the opposite direction upon coast of said structures; means operably associated with said clutch member for controlling shift thereof as a function of the relative speeds of said structures such that said clutch member is prevented from shifting to establish operation of said fast driving means during operation of said slow driving means, but is free to shift to establish operation of said fast driving means during synchronous rotation of said structures; a motor operable to shift said clutch member; a lost motion operating connection between the motor and said clutch member such that the motor may operate prior to drive-establishing shift of said clutch member as aforesaid; and means operable in response to driver operation of said accelerator pedal in said secondary overtraveling range for coincidentally rendering said motor inoperative and momentarily grounding the engine ignition system for unloading said clutch member.

17. In a power transmission for driving a vehicle having an engine provided with a throttle valve; an accelerator pedal operable by the vehicle driver; means operably connecting said accelerator pedal with said throttle valve accommodating movement of said accelerator pedal through a primary range for adjusting the throttle between its fully closed and opened positions, and through a secondary range overtraveling the primary range; a driving structure adapted to receive drive from the engine; a driven structure adapted to transmit drive from the driving structure for driving the vehicle; relatively slow speed driving means including a reaction member and an overrunning device operably associated therewith for driving the driven structure from the driving structure; relatively fast speed driving means including a shiftable clutch member for driving the driven structure from the driving structure at a speed ratio faster than that provided by said slow driving means; said overrunning device locking said reaction member against rotation in the direction of its rotational tendency during said slow speed drive and automatically operable to release said reaction member for rotation in the opposite direction upon coast of said structures; means operably associated with said clutch member for controlling shift thereof as a function of the relative speeds of said structures such that said clutch member is prevented from shifting to establish operation of said fast driving means during operation of said slow driving means, but is free to shift to establish operation of said fast driving means during synchronous rotation of said structures; a motor operable to shift said clutch member; a lost motion operating connection between the motor and said clutch member such that the motor may operate prior to drive-establishing shift of said clutch member as aforesaid; and means operable in response to driver operation of said accelerator pedal in said secondary overtraveling range for coincidentally rendering said motor inoperative and momentarily grounding the engine ignition system to effect release of said clutch member thereby changing the drive from said fast drive to said slow drive.

18. In a power transmission for a vehicle having an engine; a transmission shift member shiftable from a neutral position to establish forward drive through said transmission; a second transmission shift member shiftable from a neutral position to establish reverse drive through said transmission; change speed means operable to effect change in the transmission speed ratio; electromagnetically operated means for controlling operation of said change speed means; means controlled by the speed of the vehicle for effecting energization and de-energization of said electromagnetically operated means; and means operable by shifting of said first shift member for effecting energization and de-energization of said electromagnetically operated means.

19. In a power transmission for a vehicle having an engine; a transmission shift member shiftable from a neutral position to establish forward drive through said transmission; a second transmission shift member shiftable only when the aforesaid member is in neutral position from a neutral position to establish reverse drive through said transmission; change speed means operable to effect change in the transmission speed ratio when the vehicle is accelerated from rest to a predetermined speed; electromagnetically operated means for controlling operation of said change speed means; and means operable when said first member is in neutral for rendering said electromagnetically operated means inoperable during reverse driving through said transmission.

20. In a power transmission for a vehicle having an engine; a member shiftable from a neutral position to establish forward drive through said transmission; a second member shiftable from a neutral position to establish reverse drive through said transmission; change speed means operable to effect change in the transmission speed ratio; solenoid operated means for controlling operation of said change speed means; governor means; a switch controlled by said governor means; means for driving said governor means at a speed proportionate to the vehicle speed such that said solenoid is energized when the vehicle is accelerated from rest to a predetermined speed; and a second switch controlled by one of said shiftable members for de-energizing said solenoid when said transmission is set for reverse drive.

21. In a power transmission for a vehicle having an engine; a member shiftable from a neutral position to establish forward drive through said transmission; a second member shiftable from a neutral position to establish reverse drive through said transmission; change speed means operable to effect change in the transmission speed ratio; solenoid operated means for controlling operation of said change speed means; governor means; a switch controlled by said governor means; means for driving said governor means at a speed proportionate to the vehicle speed such that said solenoid is energized when the vehicle is accelerated from rest to a predetermined speed; and a second switch controlled by one of said shiftable members for maintaining said solenoid in de-energized condition during reverse driving.

22. In a motor vehicle power transmission having a driving shaft adapted to receive drive from the vehicle engine and a driven shaft adapted to drive the vehicle; means for driving said driven shaft from said driving shaft at a reduced speed relative thereto; means for driving said driven shaft directly from said driving shaft; a clutch member carried by one of said shafts and adapted to engage the other of said shafts to establish said direct drive upon the vehicle being accelerated from rest to a predetermined speed; means for establishing forward and reverse drive through said transmission comprising a pair of shiftable members; and means operable by movement of one of said shiftable members into neutral position for causing said clutch member to engage said other shaft.

23. In a motor vehicle power transmission having a driving shaft adapted to receive drive from the vehicle engine and a driven shaft adapted to drive the vehicle; means for driving said driven shaft from said driving shaft at a reduced speed relative thereto; means for driving said driven shaft directly from said driving shaft; a clutch member carried by one of said shafts; means including a solenoid for moving said clutch member into clutching engagement with the other of said shafts, said means being operable to move said clutch member into engagement upon de-energization of said solenoid and to move said clutch member out of engagement upon energization of said solenoid; a plurality of control means for energizing and de-energizing said solenoid; means comprising a shiftable member for establishing drive through said transmission; and means operable upon shifting of said member into neutral position for de-energizing said solenoid and for maintaining it in de-energized condition during reverse driving.

24. In a motor vehicle power transmission having a driving shaft adapted to receive drive from the vehicle engine and a driven shaft adapted to drive the vehicle; means for driving said driven shaft from said driving shaft at a reduced speed relative thereto; means for driving said driven shaft directly from said driving shaft; a clutch member carried by one of said shafts; means including a solenoid for moving said clutch member into clutching engagement with the other of said shafts, said means being operable to move said clutch member into engagement upon de-energization of said solenoid and to move said clutch member out of engagement upon energization of said solenoid; a plurality of control means for energizing and de-energizing said solenoid; means comprising a shiftable member for establishing drive through said transmission; and means operable independently of said plurality of control means upon shifting of said member into neutral position for de-energizing said solenoid and for maintaining it in de-energized condition during reverse driving.

25. In a motor vehicle power transmission having a driving shaft adapted to receive drive from the vehicle engine and a driven shaft adapted to drive the vehicle; means for driving said driven shaft from said driving shaft at a reduced speed relative thereto; means for driving said driven shaft directly from said driving shaft; a clutch member carried by one of said shafts; means including a solenoid for moving said clutch member into clutching engagement with the other of said shafts, said means being operable to move said clutch member into engagement upon de-energization of said solenoid and to move said clutch member out of engagement upon energization of said solenoid; a plurality of control means for energizing and de-energizing said solenoid; means comprising a shiftable member for establishing drive through said transmission; and a switch engageable by said shiftable member upon shifting of said member into neutral position for de-energizing said solenoid and for rendering said control means inoperable.

26. In a power transmission for a vehicle having an engine; a member shiftable from a neutral position to establish forward drive through said transmission; a second member shiftable from a neutral position to establish reverse drive through said transmission; interlocking means operable to prevent shifting of one of said members unless the other is in neutral position; change speed means operable to effect change in the transmission speed ratio; solenoid operated means for controlling operation of said change speed means; means controlled by the speed of the vehicle for effecting energization and de-energization of said solenoid; and means operable by shifting of said first shiftable member for effecting energization and de-energization of said solenoid.

27. In a motor vehicle transmission; a driving shaft adapted to receive drive from the motor of said vehicle; an intermediate shaft; means including countershaft gearing for drivingly connecting said driving shaft with said intermediate shaft for forward or reverse rotation; a driven shaft; planetary gearing means for drivingly connecting said intermediate shaft with said driven shaft including a pair of overrunning devices associated with one of the planetary gear elements and adapted to function alternately in accordance with the direction of torque flow through the transmission; and means for automatically releasing the drive between said driving and intermediate shafts upon deceleration of the vehicle during reverse driving of said intermediate shaft.

28. In a motor vehicle transmission; a driving shaft adapted to receive drive from the motor of said vehicle; an intermediate shaft; means including countershaft gearing for drivingly connecting said driving shaft with said intermediate shaft for forward or reverse rotation; a driven shaft; planetary gearing means for drivingly connecting said intermediate shaft with said driven shaft including a pair of overrunning devices associated with one of the planetary gear elements and adapted to function alternately in accordance with the direction of torque flow through the transmission; the driving connection between said driving shaft and said intermediate shaft also including an overrunning device for automatically releasing the drive during deceleration of the vehicle during reverse driving.

29. In a motor vehicle power transmission; a driving shaft adapted to receive drive from the vehicle engine; a driven shaft adapted to drive the vehicle; an intermediate shaft adapted to transmit drive from said driving shaft to said driven shaft; means for driving said intermediate shaft from said driving shaft in a forward or reverse direction relative to said driving shaft; means for driving said driven shaft from said intermediate shaft comprising an annulus gear rotatable with said intermediate shaft, a planet carrier rotatable with said driven shaft, and a sun gear adapted to be locked against rotation to provide reaction for said carrier; means including a pair of alternately acting overrunning devices for controlling said sun gear; and means for automatically releasing the drive between said intermediate shaft and said driving shaft upon reversal of torque on said driven shaft during reverse driving of said intermediate shaft.

30. In a motor vehicle power transmission having a driven shaft adapted to drive the vehicle; a second shaft driven by the vehicle engine; means drivingly connecting said shafts comprising a planetary gearset including a reaction element adapted to be locked against reverse rotation; a one-way brake means for locking said reaction element; a one-way clutch for clutching said reaction element to said driven shaft in response to forward rotation of said element; means for driving said second shaft from said engine in a forward or reverse direction; and means automatically operable to disconnect the drive between said second shaft and the engine during deceleration of said vehicle in reverse drive.

31. In a power transmission for driving a vehicle having an engine; a fluid pressure actuated motor for controlling operation of said transmission; a pump for supplying fluid under pressure to said motor; means for driving said pump; a valving means operable to admit pressure fluid from said pump to said motor and to vent said motor; a solenoid for controlling said valving means, said solenoid being so constructed and arranged that pressure fluid is admitted to said motor when said solenoid is de-energized and said motor is vented when said solenoid is energized; and a plurality of circuits for energizing said solenoid, one of said circuits including a switch operable upon shifting of said transmission into reverse drive for de-energizing said solenoid.

32. In a power transmission for driving a vehicle having an engine; a fluid pressure actuated motor for controlling operation of said transmission; a pump for supplying fluid under pressure to said motor; means for driving said pump; a valving means operable to admit pressure fluid from said pump to said motor and to vent said motor; said valving means comprising a housing having an inlet port and two outlet ports leading to said motor and the transmission lubricating system respectively; a pair of pistons axially slidable in said housing; a spring for urging said pistons in one direction, one of said pistons being adapted upon admission of pressure fluid to said valving means to uncover the lubricating port of said housing; and means independent of said spring for controlling the position of the other of said pistons.

33. In a power transmission for driving a vehicle having an engine; a fluid pressure actuated motor for controlling operation of said transmission; a pump for supplying fluid under pressure to said motor; means for driving said pump; a valve for controlling the output of said pump; said valve having a port for supplying said motor and a port for supplying the transmission lubricating system; a pair of axially aligned, independently slidable pistons disposed in operative relationship with said ports; a spring for resisting movement of one of said pistons by the pressure fluid, movement of said piston against said spring acting to uncover the lubricating system supply port; independent control means for the other piston; said other piston being arranged for movement by said control means to cut off supply of fluid to said motor.

34. In a power transmission for driving a vehicle having an engine; a fluid pressure actuated motor for controlling operation of said transmission; a pump for supplying fluid under pressure to said motor; means for driving said pump; a valve for controlling the output of said pump; said valve having a port for supplying said motor and a port for supplying the transmission lubricating system; a pair of axially aligned, independently slidable pistons disposed in operative relationship with said ports; a spring for resisting movement of one of said pistons by the pressure fluid, movement of said piston against said spring acting to uncover the lubricating system supply port; a solenoid for controlling the other of said pistons; said latter piston being movable under the influence of said solenoid to cut off supply of fluid to said motor and movable by said pressure fluid upon de-energization of said solenoid to establish supply of fluid to said motor.

35. In a motor vehicle power transmission having a casing, a drive shaft adapted to receive drive from the vehicle engine; a driven shaft adapted to drive the vehicle; a planetary gearset having a drive element adapted to be driven by said drive shaft; a driven element drivingly connected to said driven shaft, and a drive-reaction-taking element loosely journaled on said driven shaft; means for locking said reaction element against reverse rotation relative to said other elements to establish a torque varying drive between said shafts; a drive controlling sleeve extending axially from said reaction element, a clutch element carried by said driven shaft and adapted for movement to engage said sleeve, a blocker member carried by said driven shaft within said sleeve, yieldable means for retaining said blocker member in such position relative to said clutch element that driving engagement thereof is prevented, an overrunning device between said sleeve and said blocker member, said device being adapted to permit said blocker member to overrun said sleeve during operation of said torque multiplying drive and being operable to establish a driving connection between said sleeve and blocker member upon reversal of driving torque through said transmission, caused by a slowing down of the vehicle engine relative to said driven shaft, to move said blocker member to non-blocking position; and means for moving said clutch element into engagement with said sleeve comprising a motor operable to move said element; a lost motion operating connection between the motor and said clutch element such that the motor may operate prior to movement of said element.

36. In a motor vehicle power transmission having a casing, a drive shaft adapted to receive drive from the vehicle engine; a driven shaft adapted to drive the vehicle; a planetary gearset having a drive element adapted to be driven by said drive shaft; a driven element drivingly connected to said driven shaft, and a drive-reaction-taking element loosely journaled on said driven shaft; means for locking said reaction element against reverse rotation relative to said other elements to establish a torque varying drive between said shafts; a drive controlling sleeve extending axially from said reaction element, a clutch element carried by said driven shaft and adapted for movement to engage said sleeve, a blocker member carried by said driven shaft within said sleeve, yieldable means for retaining said blocker member in such position relative to said clutch element that driving engagement thereof is prevented, an overrunning device between said sleeve and said blocker member, said device being adapted to permit said blocker member to overrun said sleeve during operation of said torque multiplying drive and being operable to establish a driving connection between said sleeve and blocker member upon reversal of driving torque through said transmission, caused by a slowing down of the vehicle engine relative to said driven shaft, to move said blocker member to non-blocking position; and means for moving said clutch element into engagement with said sleeve comprising a motor operable to move said element; a lost motion operating connection between the motor and said clutch element such that the motor may operate prior to movement of said element; a plurality of independently operable control elements adapted for selective actuation by the vehicle driver; and a plurality of means respectively operating in response to driver actuation of said control elements for rendering said motor inoperative.

37. In a power transmission; a drive shaft; a driven shaft adapted to be driven from said drive shaft at a 1 to 1 speed ratio with respect thereto or at a speed ratio different from said 1 to 1 ratio; a driving element adapted to be held stationary during said different speed ratio drive and to be clutched to said driven shaft to establish said 1 to 1 ratio drive; a clutch member adapted for movement to engage said element; a set of teeth on said element; a set of teeth on said clutch member; a blocker member operably associated with said driving element; a projection on said blocker member extending axially thereof; a recess in said clutch member adapted to receive the aforesaid projection when aligned therewith; means for yieldably holding said blocker member in blocking position such that said projection abuts said clutch member to thereby prevent movement thereof into engagement with said driving element; and means operable upon reversal of driving torque through the transmission for moving said blocker member out of blocking position.

38. In combination, coacting power transmitting members having means for positively engaging with one another comprising a clutch member carried by one of said members and means for shifting said clutch member into engagement with the other of said members; a casing for said members; an overrunning roller device operably associated with said casing and one of said members and adapted to hold said member against rotation in one direction; a second overrunning roller device operably associated with both of said members and adapted to engage said members to synchronize their speeds in the opposite direction of rotation; a common cage for carrying the rollers of said roller devices, said cage being so constructed and arranged that one of said overrunning devices is held in disengaged position during engagement of the other; and means operable upon shifting of said clutch member to engage said members for locking said first overrunning device in disengaged position.

39. In combination, coacting power transmitting members having means for positively engaging with one another comprising a clutch member carried by one of said members and means for shifting said clutch member into engagement with the other of said members; a casing for said members; an overrunning roller device operably associated with said casing and one of said members and adapted to hold said member against rotation in one direction; a second overrunning roller device operably associated with both of said members and adapted to engage said members to synchronize their speeds in the opposite direction of rotation; and means operable upon shifting of said clutch member to engage said members for locking said first overrunning device in disengaged position.

40. In combination, coacting power transmitting members having means for positively engaging with one another comprising a clutch member carried by one of said members and means for shifting said clutch member into engagement with the other of said members; a casing for said members; an overrunning roller device operably associated with said casing and one of said members and adapted to hold said member against rotation in one direction; a second overrunning roller device operably associated with both of said members and adapted to engage said members to synchronize their speeds in the opposite direction of rotation; a common cage for carrying the rollers of said roller devices, said cage being rotatable from a first position wherein said first overrunning device is operable to a second position wherein said second overrunning device is operable; and means operable upon shifting of said clutch member to engage said members for locking said cage in one of said positions.

41. In combination; coacting power transmitting members having means for positively engaging with one another comprising a clutch member carried by one of said members and means for shifting said clutch member into engagement with the other of said members; a casing for said members; an overrunning roller device operably associated with said casing and one of said members and adapted to hold said member against rotation in one direction; a second overrunning roller device operably associated with both of said members and adapted to engage said members to synchronize their speeds in the opposite direction of rotation; a common cage for carrying the rollers of said roller devices, said cage being so constructed and arranged that one of said overrunning devices is held in disengaged position during engagement of the other; and means operable upon shifting of said clutch member to engage said members for locking said first overrunning device in disengaged position comprising a finger carried by said clutch member adapted for engagement with said cage.

42. In combination, coacting power transmitting members having means for positively engaging with one another comprising a clutch member carried by one of said members and means for shifting said clutch member into engagement with the other of said members; a casing for said members; an overrunning roller device operably associated with said casing and one of said members and adapted to hold said member against rotation in one direction; a second overrunning roller device operably associated with both of said members and adapted to engage said members to synchronize their speeds in the opposite direction of rotation; and means carried by said clutch member and operable upon shifting of said member to engage said power transmitting members for locking said first overrunning device in disengaged position.

43. In combination, coacting power transmitting members having means for positively engaging with one another comprising a clutch member carried by one of said members and means for shifting said clutch member into engagement with the other of said members; a casing for said members; an overrunning roller device operably associated with said casing and one of said members and adapted to hold said member against rotation in one direction; a second overrunning roller device operably associated with both of said members and adapted to engage said members to synchronize their speeds in the opposite direction of rotation; and means operable upon the shifting of said clutch member for locking one of said overrunning devices in disengaged position.

44. In a power transmission for driving a vehicle having a motor, a drive structure adapted to receive drive from the motor; a driven structure adapted to drive the vehicle; means for driving the driven structure from the drive structure at a 1 to 1 ratio or at a speed ratio different from said 1 to 1 ratio; said means including a drive element adapted to be held stationary during said different speed ratio drive; a clutch member drivingly connected to said driven structure; a set of teeth on said drive element; a set of teeth on said clutch member; said sets of teeth adapted for engagement upon movement of said clutch member toward said drive element to establish said 1 to 1 ratio drive; a blocker member operably associated with said drive element and adapted to prevent engagement of said sets of teeth while their speeds are asynchronous; said blocker member having a portion projecting therefrom toward said clutch member and adapted to abut said clutch member in one position of said blocker member; said clutch member having a recess adapted to receive said projecting portion of said blocker member in another position of said blocker member to permit movement of said clutch member to engage said teeth.

45. In a power transmission for driving a vehicle having a motor, a drive structure adapted to receive drive from the motor; a driven structure adapted to drive the vehicle; means for driving the driven structure from the drive structure at a 1 to 1 ratio or at a speed ratio different from said 1 to 1 ratio; said means including a drive element adapted to be held stationary during said different speed ratio drive; a clutch member drivingly connected to said driven structure; a set of teeth on said drive element; a set of teeth on said clutch member; said sets of teeth adapted for engagement upon movement of said clutch member toward said drive element to establish said 1 to 1 ratio drive; an overrunning roller device for holding said drive element against rotation during said different speed ratio drive; and means operably associated with said clutch member for rendering said roller device ineffective during said 1 to 1 ratio drive.

46. In a power transmission for driving a vehicle having a motor, a drive structure adapted to receive drive from the motor; a driven structure adapted to drive the vehicle; means for driving the driven structure from the drive structure at a 1 to 1 ratio or at a speed ratio different from said 1 to 1 ratio; said means including a drive element adapted to be held stationary during said different speed ratio drive; a clutch member drivingly connected to said driven structure; a set of teeth on said drive element; a set of teeth on said clutch member; said sets of teeth adapted for engagement upon movement of said clutch member toward said drive element to establish said 1 to 1 ratio drive; an overrunning roller device for holding said drive element against rotation during said different speed ratio drive; and means operably associated with said clutch member for rendering said roller device ineffective during said 1 to 1 ratio drive, comprising a member operable upon movement of said clutch member into engagement with drive member for holding said roller device in inoperative position.

47. In a power transmission for driving a vehicle having a motor, a drive structure adapted to receive drive from the motor; a driven structure adapted to drive the vehicle; means for driving the driven structure from the drive structure at a 1 to 1 ratio or at a speed ratio different from said 1 to 1 ratio; said means including a drive element adapted to be held stationary during said different speed ratio drive; a clutch member drivingly connected to said driven structure; a set of teeth on said drive element; a set of teeth on said clutch member; said sets of teeth adapted for engagement upon movement of said clutch member toward said drive element to establish said 1 to 1 ratio drive; an overrunning roller device adapted for holding said drive element against rotation during said different speed ratio drive; a second overrunning device adapted for drivingly connecting said driving and driven structures and for synchronizing the same preparatory to establishment of said 1 to 1 ratio drive; and means operably associated with said clutch member and adapted upon movement of said member into engagement with said drive element for rendering said first overrunning device inoperative.

48. In a power transmission for driving a vehicle having a motor, a drive structure adapted to receive drive from the motor; a driven structure adapted to drive the vehicle; means for driving the driven structure from the drive structure at a 1 to 1 ratio or at a speed ratio different from said 1 to 1 ratio; said means including a drive element adapted to be held stationary during said different speed ratio drive; a clutch member drivingly connected to said driven structure; a set of teeth on said drive element; a set of teeth on said clutch member; said sets of teeth being adapted for engagement upon movement of said clutch member toward said drive element to establish said 1 to 1 ratio drive; an overrunning roller device adapted for holding said drive element against rotation during said different speed ratio drive; a second overrunning device adapted for drivingly connecting said driving and driven structures and for synchronizing the same preparatory to establishment of said 1 to 1 ratio drive; a common cage for said overrunning devices; and means operably associated with said clutch member for engaging said cage upon movement of said clutch member into engagement with said drive element for locking said cage in such position that one of said overrunning devices is rendered inoperative.

CARL A. NERACHER.
WILLIAM T. DUNN.
TENO IAVELLI.
AUGUSTIN J. SYROVY.

CERTIFICATE OF CORRECTION.

Patent No. 2,333,668. November 9, 1943.

CARL A. NERACHER, ET AL.

It is hereby certified that error appears in the printed specification of the above numbered patent requiring correction as follows: Page 4, first column, line 68, after "swing" insert --lever--; page 8, second column, line 40, for "slutch" read --clutch--; page 14, first column, line 34, claim 4, for "driven" read --driver--; line 38, for "operable" read --operably--; page 17, second column, line 13, claim 19, after "neutral" insert --position--; and that the said Letters Patent should be read with this correction therein that the same may conform to the record of the case in the Patent Office.

Signed and sealed this 18th day of April, A. D. 1944.

(Seal)

Leslie Frazer
Acting Commissioner of Patents.